(12) United States Patent
Xu et al.

(10) Patent No.: US 12,369,146 B2
(45) Date of Patent: Jul. 22, 2025

(54) USER EQUIPMENT, ELECTRONIC DEVICE, WIRELESS COMMUNICATION METHOD, AND STORAGE MEDIUM

(71) Applicant: Sony Group Corporation, Tokyo (JP)

(72) Inventors: Jin Xu, Beijing (CN); Dongru Li, Beijing (CN); Wenjing Ren, Beijing (CN); Xiaofeng Tao, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 15 days.

(21) Appl. No.: 18/414,516

(22) Filed: Jan. 17, 2024

(65) Prior Publication Data

US 2024/0155593 A1 May 9, 2024

Related U.S. Application Data

(63) Continuation of application No. 17/257,018, filed as application No. PCT/CN2019/096290 on Jul. 17, 2019, now abandoned.

(30) Foreign Application Priority Data

Jul. 24, 2018 (CN) .......................... 201810819735.5

(51) Int. Cl.
*H04W 72/044* (2023.01)
*H04B 7/06* (2006.01)
(Continued)

(52) U.S. Cl.
CPC ........ *H04W 72/046* (2013.01); *H04B 7/0695* (2013.01); *H04W 72/23* (2023.01); *H04W 72/542* (2023.01)

(58) Field of Classification Search
CPC . H04W 72/046; H04W 72/542; H04W 72/23; H04B 7/0695
See application file for complete search history.

(56) References Cited

U.S. PATENT DOCUMENTS

2013/0172002 A1 7/2013 Yu et al.
2015/0257073 A1 9/2015 Park et al.
(Continued)

FOREIGN PATENT DOCUMENTS

CN 106982084 A 7/2017
CN 107733497 A 2/2018
(Continued)

OTHER PUBLICATIONS

International Search Report and Written Opinion mailed on Sep. 27, 2019, received for PCT Application No. PCT/CN2019/096290, Filed on Jul. 17, 2019, 9 pages including English Translation.
(Continued)

*Primary Examiner* — Jasper Kwoh
(74) *Attorney, Agent, or Firm* — XSENSUS LLP

(57) ABSTRACT

The present invention relates to a user equipment, an electronic device, a wireless communication method, and a storage medium. The user equipment according to the present invention comprises a processing circuit configured to: select G transmit beam groups from K transmit beams of a network side device; and sending information about the selected G transmit beam groups to the network side device, wherein each of the G transmit beam groups comprises N transmit beams, the user equipment is capable of simultaneously receiving downlink information that the network side device sends by using the N transmit beams, and K, N, G are all integers greater than 1. The use of the user equipment, the electronic device, the wireless communication method, and the storage medium according to the
(Continued)

present invention can improve beam selection process in a system that uses a beamforming technique.

20 Claims, 9 Drawing Sheets

(51) Int. Cl.
*H04W 72/23* (2023.01)
*H04W 72/542* (2023.01)

(56) References Cited

U.S. PATENT DOCUMENTS

| | | | |
|---|---|---|---|
| 2016/0028519 A1 | 1/2016 | Wei | |
| 2018/0006706 A1 | 1/2018 | Cheng et al. | |
| 2018/0083682 A1 | 3/2018 | Li et al. | |
| 2018/0132266 A1 | 5/2018 | Chen et al. | |
| 2019/0238210 A1 | 8/2019 | Tang et al. | |
| 2019/0327632 A1 | 10/2019 | Kim et al. | |
| 2019/0342871 A1 | 11/2019 | Tang | |
| 2019/0394664 A1 | 12/2019 | Sun | |
| 2020/0014442 A1 | 1/2020 | Tang | |
| 2020/0014455 A1 | 1/2020 | Gao et al. | |
| 2020/0120531 A1 | 4/2020 | Qin et al. | |
| 2020/0169896 A1 | 5/2020 | Li et al. | |
| 2020/0177265 A1* | 6/2020 | Guan | H04B 7/088 |
| 2021/0067233 A1 | 3/2021 | Guan et al. | |

FOREIGN PATENT DOCUMENTS

| | | |
|---|---|---|
| CN | 108243430 A | 7/2018 |
| JP | 2018050333 A | 3/2018 |
| WO | 2017/196491 A1 | 11/2017 |

OTHER PUBLICATIONS

Samsung, Discussion on group-based beam reporting, 3GPP TSG RAN WG1 #90 R1-1714511, Internet<URL:http://www.3gpp.org/ftp/tsg_ran/WG1_RL1/TSGR1_90/Docs/R1-1714511.zip>, Aug. 11, 2017.

CATT, Discussion on beam reporting, 3GPP TSG RAN WG1 #87 R1-1611385, Internet<URL :http://www.3gpp.org/ftp/tsg_ran/WG1_RL1/TSGR1_87/Docs/R1-1611385.zip>, Nov. 15, 2016.

Huawei. HiSilicon, DL beam management with reduced overhead, 3GPP TSG RAN WG1 #88 R1-1701720, Internet<URL:http://www.3gpp.org/ftp/tsg_ran/WG1_RL1/TSGR1_88/Docs/R1-1701720.zip>, Feb. 6, 2017.

Intel Corporation, Discussion on Beam Reporting, and 3GPP TSG RAN WG1 #90 R1-1712549, Internet<URL:http://www.3gpp.org/ftp/tsg_ran/WG1_RL1/TSGR1_90/Docs/R1-1712549.zip>, Aug. 22, 2017.

InterDigital, Inc., Remaining issues on beam management, 3GPP TSG RAN WG1 #91 R1-1720630, Internet<URL:http://www.3gpp.org/ftp/tsg_ran/WG1_RL1/TSGR1_91/Docs/R1-1720630.zip>, Nov. 18, 2017.

* cited by examiner

USER EQUIPMENT, ELECTRONIC DEVICE, WIRELESS COMMUNICATION METHOD, AND STORAGE MEDIUM

CROSS-REFERENCE TO RELATED APPLICATIONS

The present application is a continuation of U.S. application Ser. No. 17/257,018, filed Dec. 30, 2020, which is based on PCT filing PCT/CN2019/096290, filed Jul. 17, 2019, which claims priority to Chinese Patent Application No. 201810819735.5, titled "USER EQUIPMENT, ELECTRONIC DEVICE, WIRELESS COMMUNICATION METHOD, AND STORAGE MEDIUM", filed on Jul. 24, 2018, with the Chinese Patent Office, each of which is incorporated herein by reference in its entirety.

FIELD

Embodiments of the present disclosure generally relate to the field of wireless communications, and in particular to a user equipment, an electronic device, a wireless communication method and a computer readable storage medium. More particularly, the present disclosure relates to a user equipment in a wireless communication system, an electronic device as a network side device in a wireless communication system, a wireless communication method performed by a network side device in a wireless communication system, a wireless communication method performed by a user equipment in a wireless communication system, and a computer readable storage medium.

BACKGROUND

The beamforming technology is a signal preprocessing technology based on an antenna array. In the beamforming technology, a beam having directivity is generated by adjusting a weighting coefficient of each array element in the antenna array, so as to acquire significant array gain. Therefore, the beamforming technology has great advantages in expanding coverage, improving edge throughput and suppressing interference.

In a wireless communication system to which the beamforming technology is applied, in the case of downlink transmission, a network side device may select a proper transmit beam for transmitting downlink information from multiple candidate transmit beams reported by a user equipment. In this case, the user equipment is required to report the multiple candidate transmit beams. Therefore, how the user equipment properly selects and reports the candidate transmit beams and how the network side device informs the user equipment of the transmit beam for transmitting the downlink information are technical problems to be solved urgently.

Therefore, an object of the present disclosure is to provide a user equipment, an electronic device, a wireless communication method and a computer readable storage medium, to solve at least one of the above technical problems.

SUMMARY

The part provides a general summary of the present disclosure, rather than a comprehensive disclosure of a full scope or all features of the present disclosure.

An object of the present disclosure is to provide a user equipment, an electronic device, a wireless communication method and a computer readable storage medium, to improve beam selection in a system to which the beamforming technology is applied.

According to an aspect of the present disclosure, a user equipment is provided. The user equipment includes processing circuitry. The processing circuitry is configured to: select G groups of transmit beams from K transmit beams of a network side device; and transmit information about the selected G groups of transmit beams to the network side device. Each of the G groups of transmit beams includes N transmit beams. The user equipment is capable of simultaneously receiving downlink information transmitted by the network side device using the N transmit beams. Each of K, N and G is an integer greater than 1.

According to another aspect of the present disclosure, an electronic device is provided. The electronic device includes processing circuitry. The processing circuitry is configured to: receive information about G groups of transmit beams from a user equipment; and select a group of transmit beams for transmitting downlink information from the G groups of transmit beams. Each of the G groups of transmit beams includes N transmit beams. The user equipment is capable of simultaneously receiving downlink information transmitted by the electronic device using the N transmit beams. Each of N and G is an integer greater than 1.

According to another aspect of the present disclosure, a wireless communication method performed by a user equipment is provided. The method includes: selecting G groups of transmit beams from K transmit beams of a network side device and transmitting information about the selected G groups of transmit beams to the network side device. Each of the G groups of transmit beams includes N transmit beams. The user equipment is capable of simultaneously receiving downlink information transmitted by the network side device using the N transmit beams. Each of K, N and G is an integer greater than 1.

According to another aspect of the present disclosure, a wireless communication method performed by a network side device is provided. The method includes: receiving information about G groups of transmit beams from a user equipment; and selecting a group of transmit beams for transmitting downlink information from the G groups of transmit beams. Each of the G groups of transmit beams includes N transmit beams. The user equipment is capable of simultaneously receiving downlink information transmitted by the electronic device using the N transmit beams. Each of N and G is an integer greater than 1.

According to another aspect of the present disclosure, a computer readable storage medium is provided. The computer readable storage medium includes executable computer instructions that, when executed by a computer, cause the computer to perform the wireless communication method provided in the present disclosure.

With the user equipment, the electronic device, the wireless communication method and the computer readable storage medium provided in the present disclosure, the user equipment may select multiple groups of transmit beams and transmit information about the selected multiple groups of transmit beams to the network side device, so that the network side device can select a group of transmit beams for transmitting downlink information from the received multiple groups of transmit beams. The user equipment can simultaneously receive the downlink information transmitted by the network side device using multiple transmit beams included in each group of transmit beams. In this way, the user equipment can report multiple groups of transmit beams at one time, thereby reducing signaling overhead. In addition, the network side device can simultaneously transmit information to the user equipment using multiple transmit beams in the selected group of transmit beams, thereby improving beam selection in a system to which the beamforming technology is applied.

A further applicable field becomes apparent from the description herein. The description and specific examples in the summary are only illustrative and are not intended to limit the scope of the present disclosure.

BRIEF DESCRIPTION OF THE DRAWINGS

The drawings described herein are used for illustrating the selected embodiments only rather than all of possible embodiments, and are not intended to limit the scope of the present disclosure. In the drawings.

Figure 1:
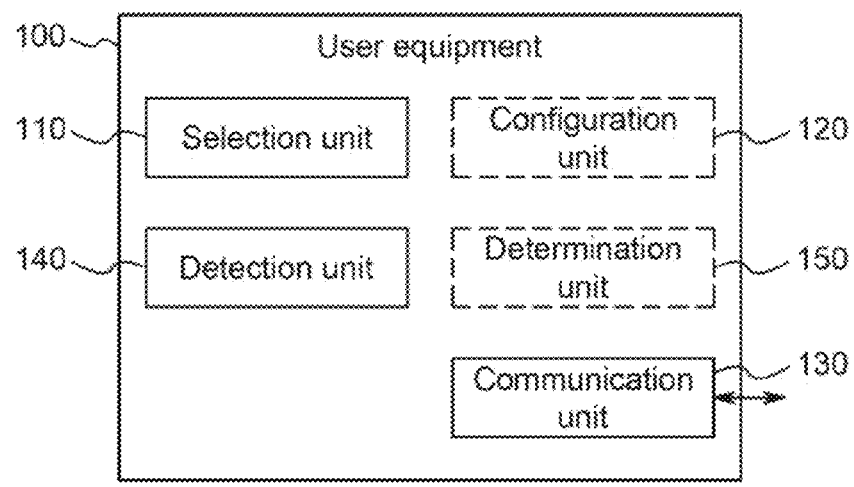
FIG. 1 is a block diagram showing a configuration example of a user equipment according to an embodiment of the present disclosure.

Although various modifications and substitutions may be made to the present disclosure, specific embodiments thereof are shown in the drawings as examples and are described in detail herein. However, it should be understood that, the description for the specific embodiments herein is not intended to limit the present disclosure into a disclosed specific form. Instead, the present disclosure aims to cover all modifications, equivalents and substitutions within the spirit and the scope of the present disclosure. It should be noted that, corresponding reference numerals indicate corresponding components throughout the drawings.

DETAILED DESCRIPTION OF EMBODIMENTS

Examples of the present disclosure are described below more fully with reference to the drawings. The following description is merely illustrative in nature and is not intended to limit the present disclosure and the application or use thereof.

Exemplary embodiments are provided so that the present disclosure can become exhaustive and the scope of the present disclosure can be fully conveyed to those skilled in the art. Examples of various specific details such as specific components, apparatuses, and methods are set forth to provide detailed understanding of the embodiments of the present disclosure. It is apparent to those skilled in the art that without specific details, the exemplary embodiments may be implemented in multiple different forms, none of which is construed as limiting the scope of the present disclosure. In some exemplary embodiments, well-known processes, well-known structures, and well-known technologies are not described in detail.

The network side device according to the present disclosure may be any type of TRP (Transmit and Receive Port). The TRP may have functions of transmitting and receiving. For example, the TRP may receive information from a user equipment and a base station device and may transmit information to a user equipment and a base station device. In an example, the TRP may serve a user equipment and is controlled by a base station device. That is, the base station device serves the user equipment via the TRP. In addition, the network side device according to the present disclosure may also be a base station device, for example, an eNB (evolved node B) or a gNB.

The user equipment according to the present disclosure may be a mobile terminal (such as a smartphone, a tablet personal computer (PC), a notebook PC, a portable game terminal, a portable/dongle mobile router, and a digital camera) or a vehicle terminal (such as a vehicle navigation device). The user equipment may also be implemented as a terminal (also referred to as a machine type communication (MTC) terminal) that performs machine-to-machine (M2M) communication. Furthermore, the user equipment may be a wireless communication module (such as an integrated circuit module including a single wafer) mounted on each of the terminals described above.

FIG. 1 is a block diagram showing a configuration example of a user equipment 100 according to an embodiment of the present disclosure.

As shown in FIG. 1, the user equipment 100 may include a selection unit 110, a configuration unit 120 and a communication unit 130.

The units of the user equipment 100 may be included in a processing circuitry. It should be noted that the user equipment 100 may include one processing circuitry or multiple processing circuitries. Further, the processing circuitry may include various discrete functional units to perform various functions and/or operations. It should be noted that the functional units may be physical entities or logical entities, and units with different names may be implemented by the same physical entity.

According to an embodiment of the present disclosure, the selection unit 110 may select G groups of transmit beams from K transmit beams of a network side device. Each of K and G is an integer greater than 1. That is, the selection unit 110 may select multiple groups of transmit beams from multiple transmit beams of the network side device.

According to an embodiment of the present disclosure, the K transmit beams may be all transmit beams of the network side device. For example, in a case that the network side device has one antenna panel, the K transmit beams may be all transmit beams emitted by the antenna panel. In a case that the network side device has multiple antenna panels, the K transmit beams may be all transmit beams emitted by the multiple antenna panels. The user equipment 100 may know information about the K transmit beams in advance. For example, the user equipment 100 may acquire the information about the K transmit beams from the network side device by high layer signaling in advance, so that the selection unit 110 may select G groups of transmit beams from the K transmit beams.

Preferably, K may be greater than or equal to G. More preferably, K may be equal to $2^k$, and G may be equal to $2^g$, where each of k and g is a positive integer. For example, K may be equal to 2, 4, 8, 16, 32 or 64, and G may be equal to 2 or 4.

According to an embodiment of the present disclosure, each of the G groups of transmit beams selected by the selection unit 110 includes N transmit beams, and the user equipment 100 is capable of simultaneously receiving downlink information transmitted by the network side device using the N transmit beams. That is, in a case that the network side device simultaneously transmits downlink information to the user equipment 100 using N transmit beams in one group of transmit beams, the user equipment can receive the downlink information that is transmitted simultaneously. N may be an integer greater than or equal to 1. That is, each group of transmit beams may include one or more transmit beams.

According to an embodiment of the present disclosure, the network side device may configure values of G and N for the user equipment 100. For example, the network side device may configure values of G and/or N for the user equipment 100 by high layer signaling including but not limited to RRC signaling. In addition, the network side device may dynamically change the values of G and/or N configured for the user equipment 100 by low layer signaling including but not limited to DCI information.

According to an embodiment of the present disclosure, the configuration unit 120 may configure information about the selected G groups of transmit beams.

According to an embodiment of the present disclosure, the communication unit 130 may transmit the information about the selected G groups of transmit beams to the network side device.

It can be seen from the above that, the user equipment 100 according to the embodiment of the present disclosure may select multiple groups of transmit beams from transmit beams of the network side device and transmit information about the multiple groups of transmit beams to the network side device. In this way, the multiple groups of transmit beams can be reported at one time, thereby reducing signaling overhead and improving beam selection in a system to which the beamforming technology is applied.

According to an embodiment of the present disclosure, the selection unit 110 may select the G groups of transmit beams according to C sets of transmit beams of the network side device so that each group of transmit beams includes N transmit beams which are respectively from N sets of transmit beams. C is an integer greater than or equal to N.

The user equipment 100 may know information about K transmit beams in the C sets of transmit beams of the network side device in advance. For example, the user equipment 100 may acquire the information about the K transmit beams in the C sets of transmit beams from the network side device by high layer signaling in advance, including but not limited to identification information of a set of transmit beams where each transmit beam lies, and identification information of the transmit beam in the set of transmit beams. Next, the selection unit 110 may select the G groups of transmit beams from the K transmit beams in the C sets of transmit beams.

Figure 2:
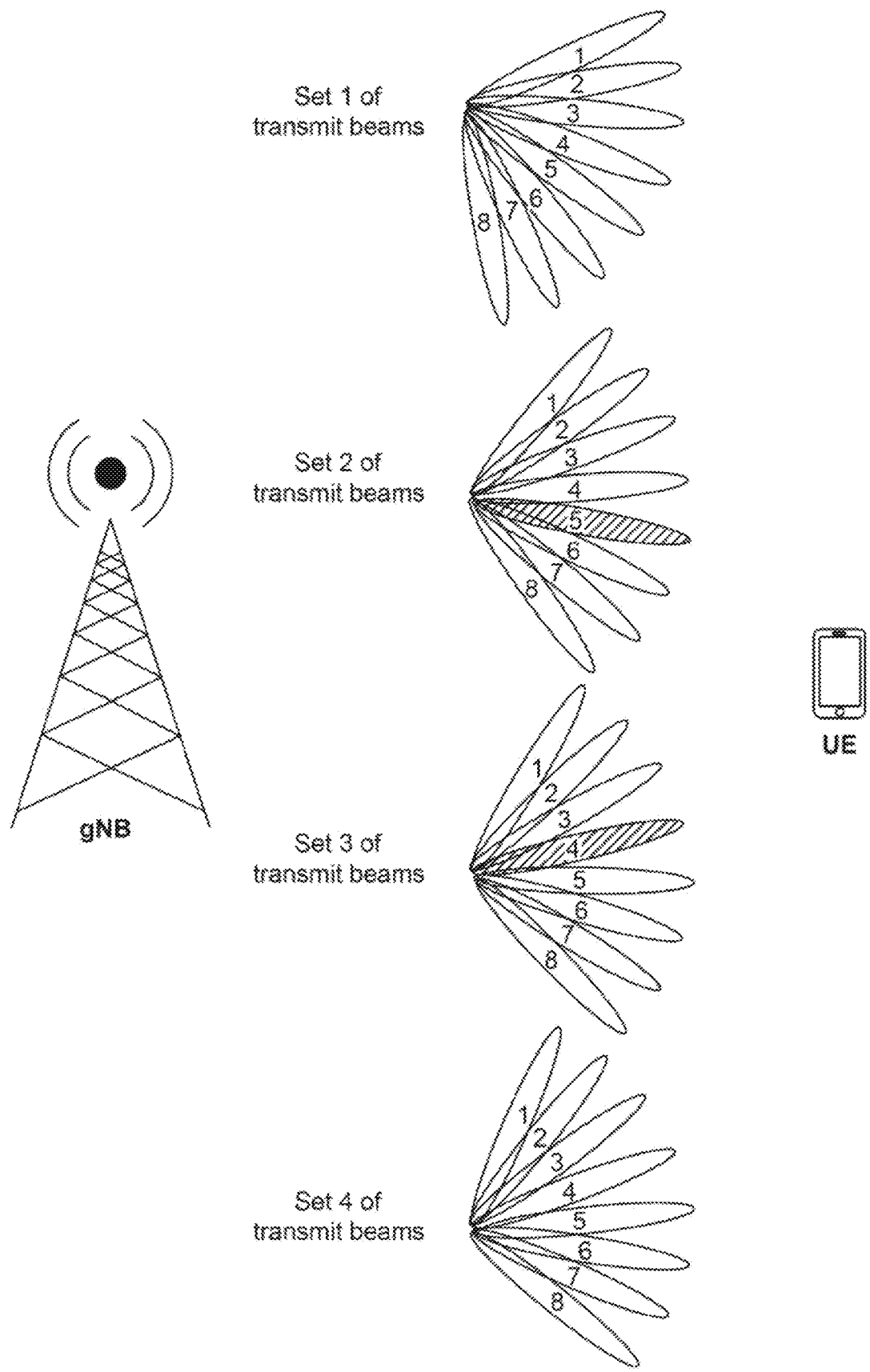
FIG. 2 is a schematic diagram showing a process of selecting a group of transmit beams by a user equipment according to an embodiment of the present disclosure.

FIG. 2 is a schematic diagram showing a process of selecting a group of transmit beams by a user equipment according to an embodiment of the present disclosure.

In FIG. 2, a gNB may serve as a network side device, and a UE may serve as the user equipment 100. As shown in FIG. 2, the gNB has 4 sets of transmit beams, that is, C is equal to 4. Each set of transmit beams includes 8 transmit beams. The gNB has 32 transmit beams in total. That is, K is equal to 32. It is assumed that N is equal to 2, that is, each of G groups of transmit beams selected by the UE includes 2 transmit beams. As shown in FIG. 2, the UE selects a transmit beam 5 in a set 2 of transmit beams and a transmit beam 4 in a set 3 of transmit beams. It can be seen that, two transmit beams selected by the UE are respectively from different sets of transmit beams. FIG. 2 only shows that the UE selects one group of transmit beams. The UE may select each of the G groups of transmit beams in the above manner so that each group of transmit beams includes two transmit beams respectively from two sets of transmit beams.

FIG. 2 illustrates a transmit beam, a set of transmit beams and a group of transmit beams in the case of C=4, K=32 and N=2, which is not limited in the present disclosure. In addition, in FIG. 2, each of the 4 sets of transmit beams includes 8 transmit beams. However, the present disclosure is not limited thereto. That is, different sets of transmit beams may include different numbers of transmit beams.

According to an embodiment of the present disclosure, each of the C sets of transmit beams of the network side device may include all transmit beams emitted by one or more antenna panels of the network side device. That is, C is equal to or less than the number of the antenna panels of the network side device.

According to an embodiment of the present disclosure, one set of transmit beams of the network side device may correspond to one antenna panel of the network side device, or may correspond to multiple antenna panels of the network side device. In a case that each set of transmit beams of the network side device corresponds to one antenna panel of the network side device, C is equal to the number of antenna panels of the network side device. Taking an example shown in FIG. 2 as an example, the gNB may have 4 antenna panels. Each of a set 1 of transmit beams, the set 2 of transmit beams, the set 3 of transmit beams, and a set 4 of transmit beams corresponds to one of the four antenna panels. For example, 8 transmit beams in the set 1 of transmit beams are emitted by a first antenna panel, 8 transmit beams in the set 2 of transmit beams are emitted by a second antenna panel, 8 transmit beams in the set 3 of transmit beams are emitted by a third antenna panel, and 8 transmit beams in the set 4 of transmit beams are emitted by a fourth antenna panel. Further, one set of transmit beams may correspond to multiple antenna panels. In this case, C is less than the number of antenna panels of the network side device. Still taking the example shown in FIG. 2 as an example, the gNB may have 5 antenna panels. The set 1 of transmit beams may correspond to a first antenna panel. The set 2 of transmit beams may correspond to a second antenna panel. The set 3 of transmit beams may correspond to a third antenna panel. The set 4 of transmit beams may correspond to a fourth antenna panel and a fifth antenna panel. That is, the 8 transmit beams in the set 4 of transmit beams are composed of all transmit beams emitted by the fourth antenna panel and all transmit beams emitted by the fifth antenna panel.

Figure 3:
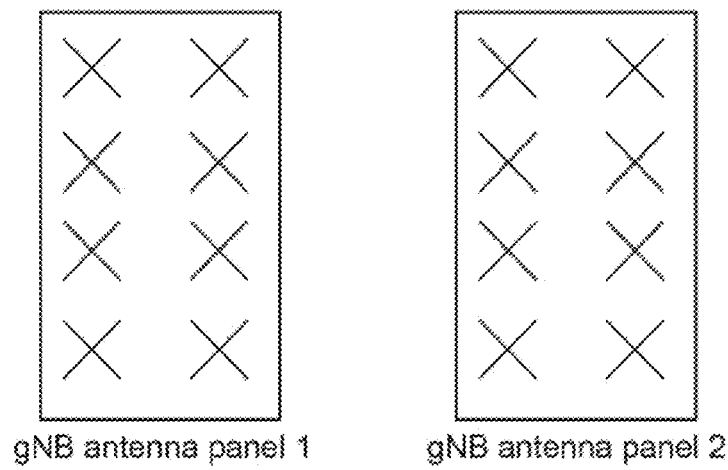
FIG. 3 is a schematic diagram showing multiple antenna panels of a network side device according to an embodiment of the present disclosure.

FIG. 3 is a schematic diagram showing multiple antenna panels of a network side device according to an embodiment of the present disclosure. Two antenna panels of a gNB are shown in FIG. 3. Each cross mark in each antenna panel indicates one transmit beam. As shown in FIG. 3, an antenna panel 1 has 8 transmit beams, and an antenna panel 2 has 8 transmit beams.

As shown in FIG. 3, the network side device may have one or more antenna panels and each antenna panel may have multiple transmit beams. At the same time, each antenna panel can transmit downlink information using only one transmit beam. That is, at the same time, each of different antenna panels may transmit downlink information using respective one transmit beam. According to an embodiment of the present disclosure, N transmit beams included in each group of transmit beams selected by the selection unit 110 are respectively from N sets of transmit beams and each set of transmit beams includes all transmit beams emitted by one or more antenna panels. In can be seen that, the N transmit beams included in each group of transmit beams are respectively from N antenna panels. The N antenna panels may be all or part of antenna panels of the network side device. In this way, the network side device can simultaneously transmit downlink information using N transmit beams in the same group of transmit beams, and the user equipment can simultaneously receive the information, thereby improving beam selection using the beamforming technology, and thus increasing transmission efficiency of downlink information.

How the selection unit 110 selects the G groups of transmit beams from K transmit beams in the C sets of transmit beams of the network side device is described in detail below. Each group of transmit beams includes N transmit beams.

As shown in FIG. 1, the user equipment 100 may further include a detection unit 140. The detection unit 140 is configured to detect channel quality between the network side device and the user equipment 100. Specifically, the detection unit 140 may detect channel quality between any one transmit beam of the network side device and the user equipment 100. In the present disclosure, the channel quality may be represented by various parameters including but not limited to RSRP (Reference Signal Receiving Power), RSRQ (Reference Signal Receiving Quality), SINR (Signal to Interference plus Noise Ratio) and the like.

According to an embodiment of the present disclosure, the detection unit 140 may detect channel quality between each of the K transmit beams of the network side device and the user equipment 100. The selection unit 110 may select the G groups of transmit beams according to the channel quality between the K transmit beams of the network side device and the user equipment 100.

According to an embodiment of the present disclosure, the channel quality may be represented by an instantaneous value of the channel quality or a mean value of the channel quality within a predetermined period of time. For example, a time window may be defined. A length of the time window in time is the predetermined period of time. For any transmit beam, the detection unit 140 may detect a mean value of channel quality between the transmit beam and the user equipment 100 within the time window. The mean value is used to represent the channel quality between the transmit beam and the user equipment 100. Within the predetermined period of time, i.e., within the time window, since the user equipment 100 may scan one transmit beam one or more times, the channel quality between the transmit beam and the user equipment 100 may be detected one or more times. Therefore, according to an embodiment of the present disclosure, for any transmit beam, a mean value of channel quality represents an average value obtained after detecting channel quality of the transmit beam one or more times.

Figure 4:
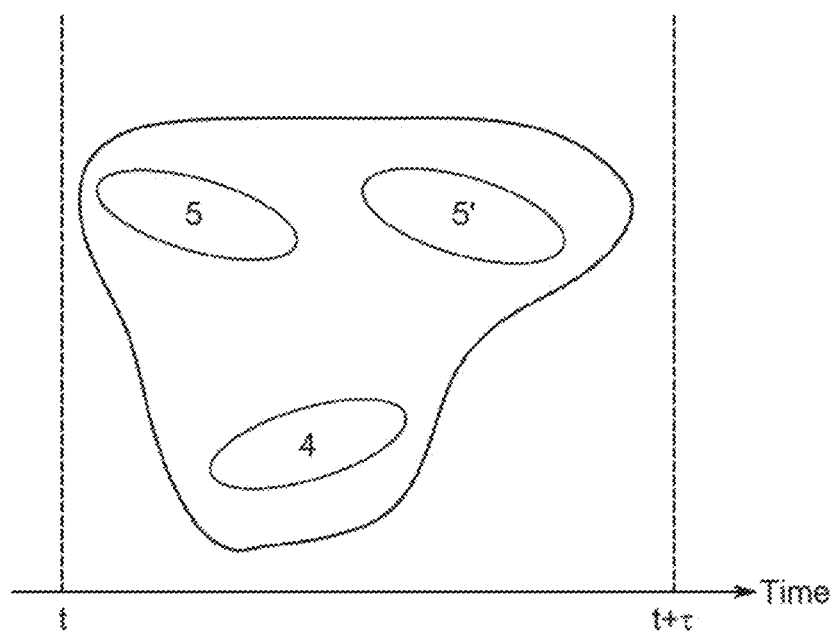
FIG. 4 is a schematic diagram showing a process of calculating channel quality according to a time window according to an embodiment of the present disclosure.

FIG. 4 is a schematic diagram showing a process of calculating channel quality according to a time window according to an embodiment of the present disclosure. In FIG. 4, a length of the time window, i.e., a length of a predetermined period of time, is indicated by T, where t indicates a time instant in a time axis. The time instant may be a start time instant of the time window defined by the detection unit 140. A beam with a reference number 4 in the time window represents the transit beam 4 in the set 3 of transmit beams shown in FIG. 2. A beam with a reference number 5 represents the transit beam 5 in the set 2 of transmit beams shown in FIG. 2. A beam with a reference number 5' represents that, scanning and channel detection are again performed on the transit beam 5 in the set 2 of transmit beams shown in FIG. 2 within the time window. That is, the beam with the reference number 5 and the beam with the reference number 5' are obtained by scanning the same transmit beam for two times. Different reference numbers are used in order to distinguish. According to an embodiment of the present disclosure, since the transit beam 4 in the set 3 of transmit beams is scanned for one time within the time window shown in FIG. 4, a current measurement result may be directly determined as a channel detection result for the transit beam 4 in the set 3 of transmit beams. In addition, since the transit beam 5 in the set 2 of transmit beams is scanned for two times within the time window shown in FIG. 4, a mean value of two measurement results may be determined as a channel detection result for the transit beam 5 in the set 2 of transmit beams. It should be noted that, FIG. 4 only shows the case of two beams for convenience of illustration. In fact, the detection unit 140 may determine channel quality of each of the K transmit beams in a similar manner.

According to an embodiment of the present disclosure, the selection unit 110 may determine all groups of transmit beams according to the C sets of transmit beams of the network side device, determine average channel quality of each group of transmit beams according to channel quality between the N transmit beams included in each group of transmit beams and the user equipment 100, and select the G groups of transmit beams according to the average channel quality of each group of transmit beams.

As described above, the selection unit 110 may select the G groups of transmit beams according to the C sets of transmit beams of the network side device so that each group of transmit beams includes N transmit beams which are respectively from N sets of transmit beams. According to an embodiment of the present disclosure, the selection unit 110 may determine all possible groups of transmit beams according to the C sets of transmit beams. Each possible group of transmit beams includes N transmit beams which are respectively from N sets of transmit beams. That is, the selection unit 110 may enumerate all groups of transmit beams meeting the following condition that the group of transmit beams includes N transmit beams which are respectively from N sets of transmit beams.

According to an embodiment of the present disclosure, the selection unit 110 may further determine average channel quality of each group of transmit beams according to channel quality between the N transmit beams included in each possible group of transmit beams determined above and the user equipment 100. For example, the selection unit may determine an arithmetical average of channel quality between the N transmit beams and the user equipment 100 as average channel quality of the group of transmit beams.

Apparently, other methods for calculating an average value may also be used, which is not limited in the present disclosure.

According to an embodiment of the present disclosure, the selection unit 110 may select the G groups of transmit beams according to the average channel quality of each group of transmit beams. For example, the selection unit 110 may select the top G groups of transmit beams having the best average channel quality from all the possible groups of transmit beams as G final groups of transmit beams.

The process of selecting a group of transmit beams according to the channel quality is described below in the case of C=2, K=8, N=2 and G=4 by way of example. Table 1 shows a value of channel quality of each of K transmit beams. In Table 1, each set of transmit beams includes 4 transmit beams. In this case, a serial number of each set of transmit beams is taken from [1, 2], and a serial number of each transmit beam is taken from [1, 2, 3, 4]. In addition, in Table 1, the channel quality is represent by RSRQ by way of example, and 8 transmit beams are ranked according to a value of the RSRQ.

TABLE 1

| Serial Number of set of Transmit Beams | Serial Number of Transmit Beam | RSRQ (dB) |
|---|---|---|
| 1 | 2 | −4.5 |
| 1 | 3 | −5.8 |
| 2 | 2 | −6 |
| 1 | 1 | −6.2 |
| 2 | 1 | −6.9 |
| 2 | 3 | −8.3 |
| 1 | 4 | −10.7 |
| 2 | 4 | −11.1 |

According to an embodiment of the present disclosure, the selection unit 110 may determine all possible groups of transmit beams. For example, in the case of C=2, K=8 and N=2, if each group of transmit beams includes 4 transmit beams, 16 possible groups of transmit beams may be determined, as shown in Table 2.

TABLE 2

| Serial Number of Group of Transmit Beams | Transmit Beam |
|---|---|
| 1 | 1, 1; 2, 1 |
| 2 | 1, 1; 2, 2 |
| 3 | 1, 1; 2, 3 |
| 4 | 1, 1; 2, 4 |
| 5 | 1, 2; 2, 1 |
| 6 | 1, 2; 2, 2 |
| 7 | 1, 2; 2, 3 |
| 8 | 1, 2; 2, 4 |
| 9 | 1, 3; 2, 1 |
| 10 | 1, 3; 2, 2 |
| 11 | 1, 3; 2, 3 |
| 12 | 1, 3; 2, 4 |
| 13 | 1, 4; 2, 1 |
| 14 | 1, 4; 2, 2 |
| 15 | 1, 4; 2, 3 |
| 16 | 1, 4; 2, 4 |

In the column of Transmit Beam in Table 2, a semicolon is used as a separator to show two transmit beams included in each group of transmit beams. In each transmit beam, a comma is used as a separator to show a serial number of a set of transmit beams where the transmit beam lies and a serial number of the transmit beam in the set of transmit beams. For example, a group of transmit beams having a serial number 1 includes two transmit beams. A serial number of a set of transmit beams where one of the two transmit beams lies is 1, and a serial number of the transmit beam is 1. A serial number of a set of transmit beams where the other of the two transmit beams lies is 2, and a serial number of the transmit beam is 1. That is, the group of transmit beams having the serial number 1 includes a transmit beam 1 in a set 1 of transmit beams and a transmit beam 1 in a set 2 of transmit beams.

Next, the selection unit 110 may determine average channel quality of each of the 16 groups of transmit beams in Table 2. For example, average channel quality of the group of transmit beams having the serial number 1 may be determined according to a mean value of channel quality of the transmit beam 1 in the set 1 of transmit beams and channel quality of the transmit beam 1 in the set 2 of transmit beams.

Next, the selection unit 110 may select the top 4 groups of transmit beams having the best average channel quality from the 16 groups of transmit beams as 4 final groups of transmit beams. Table 3 shows average channel quality of each of the selected 4 groups of transmit beams.

TABLE 3

| Serial Number of Group of Transmit Beams | Transmit Beam | Average RSRQ (dB) |
|---|---|---|
| 6 | 1, 2; 2, 2 | −5.18 |
| 5 | 1, 2; 2, 1 | −5.53 |
| 10 | 1, 3; 2, 2 | −5.92 |
| 9 | 1, 3; 2, 1 | −6.34 |

In the above example, the selection unit 110 may select the G groups of transmit beams according to the value of the RSRQ. That is, the selection unit 110 selects the G groups of transmit beams according to only one parameter representing the channel quality. According to an embodiment of the present disclosure, the selection unit 110 may select the G groups of transmit beams further according to multiple parameters representing the channel quality.

According to an embodiment of the present disclosure, the selection unit 110 may determine all possible groups of transmit beams from multiple transmit beams of which the channel quality represented by a first parameter meets a predetermined condition, and then determine average channel quality of each possible group of transmit beams. The average channel quality is represented by a second parameter representing the channel quality. Next, the selection unit 110 may select the top G groups of transmit beams having the best average channel quality. According to an embodiment of the present disclosure, the first parameter and the second parameter may be different from each other, each of which may be RSRP, RSRQ, SINR and the like.

That is, the selection unit 110 may perform first selection according to the first parameter and perform second selection according to the second parameter. For example, the selection unit 110 may select multiple transmit beams whose first parameter (for example, the RSRP) meet a predetermined threshold condition, and determine all possible groups of transmit beams from the multiple transmit beams, so as to select the top G groups of transmit beams having the best second parameter (for example, average RSRQ).

According to an embodiment of the present disclosure, the user equipment 100 may determine a group of transmit beams that is required to be reported according to one or more parameters representing the channel quality so that the selected group of transmit beams has good channel quality.

According to an embodiment of the present disclosure, after the selection unit 110 selects the G groups of transmit beams, the configuration unit 120 may configure information about the selected G groups of transmit beams and report the information about the selected G groups of transmit beams to the network side device via the communication unit 130.

According to an embodiment of the present disclosure, the configuration unit 120 may configure the information about the selected G groups of transmit beams to make the information about the selected G groups of transmit beams include identification information of the N transmit beams included in each of the G groups of transmit beams. Further, identification information of each transmit beam may include: identification information of a set of transmit beams where the transmit beam lies, and identification information of the transmit beam in the set of transmit beams.

Table 4 shows an example of the information about the selected G groups of transmit beams, where G=4 and N=2. As shown in Table 4, the information about the selected G groups of transmit beams includes identification information of 2 transmit beams included in each of 4 groups of transmit beams. Identification information of each transmit beam includes identification information of a set of transmit beams and identification information of the transmit beam in the set of transmit beams.

TABLE 4

| Transmit Beam |
| --- |
| 1, 2; 2, 2 |
| 1, 2; 2, 1 |
| 1, 3; 2, 2 |
| 1, 3; 2, 1 |

According to an embodiment of the present disclosure, the configuration unit 120 may further configure the information about the selected G groups of transmit beams to make the information about the selected G groups of transmit beams include channel quality information of all of the G groups of transmit beams. In addition, the channel quality information of each group of transmit beams includes: channel quality of each of the N transmit beams included in the group of transmit beams, or average channel quality of the group of transmit beams. Table 5 and Table 6 respectively show the information about the selected G groups of transmit beams in the case of the channel quality information of each group of transmit beams including channel quality of each of the N transmit beams included in the group of transmit beams or including average channel quality of the group of transmit beams where G=4 and N=2. In addition, the channel quality is represented by the RSRQ.

TABLE 5

| Transmit Beam | Average RSRQ (dB) |
| --- | --- |
| 1, 2; 2, 2 | −5.18 |
| 1, 2; 2, 1 | −5.53 |
| 1, 3; 2, 2 | −5.92 |
| 1, 3; 2, 1 | −6.34 |

As shown in Table 5, in addition to identification information of 2 transmit beams included in each of 4 groups of transmit beams, the information about the selected G groups of transmit beams further includes average channel quality of each group of transmit beams.

TABLE 6

| Transmit Beam | Average RSRQ (dB) |
| --- | --- |
| 1, 2; 2, 2 | −4.5; −6 |
| 1, 2; 2, 1 | −4.5; −6.9 |
| 1, 3; 2, 2 | −5.8; −6 |
| 1, 3; 2, 1 | −5.8; −6.9 |

As shown in Table 6, in addition to identification information of 2 transmit beams included in each of 4 groups of transmit beams, the information about the selected G groups of transmit beams further includes channel quality of each of the 2 transmit beams included in each group of transmit beams.

According to an embodiment of the present disclosure, the configuration unit 120 may further configure the information about the selected G groups of transmit beams to make the information about the selected G groups of transmit beams include channel quality information of part of the G groups of transmit beams. For example, the part of the G groups of transmit beams may include a group of transmit beams having the best average channel quality and a group of transmit beams having the worst average channel quality among the G groups of transmit beams.

Similarly, channel quality information of each of the part of the G groups of transmit beams may include: channel quality of each of the N transmit beams included in the group of transmit beams, or average channel quality of the group of transmit beams. Table 7 and Table 8 respectively show the information about the selected G groups of transmit beams respectively in the case of the channel quality information of each of the part of the G groups of transmit beams including channel quality of each of the N transmit beams included in the group of transmit beams or including average channel quality of the group of transmit beams, where G=4 and N=2. In addition, the channel quality is represented by the RSRQ.

TABLE 7

| Transmit Beam | Average RSRQ (dB) |
| --- | --- |
| 1, 2; 2, 2 | −5.18 |
| 1, 2; 2, 1 | |
| 1, 3; 2, 2 | |
| 1, 3; 2, 1 | −6.34 |

As shown in Table 7, in addition to identification information of 2 transmit beams included in each of 4 groups of transmit beams, the information about the selected G groups of transmit beams further includes average channel quality of a group of transmit beams having the best average channel quality among the 4 groups of transmit beams and average channel quality of a group of transmit beams having the worst average channel quality among the 4 groups of transmit beams.

TABLE 8

| Transmit Beam | Average RSRQ (dB) |
| --- | --- |
| 1, 2; 2, 2 | −4.5; −6 |
| 1, 2; 2, 1 | |
| 1, 3; 2, 2 | |
| 1, 3; 2, 1 | −5.8; −6.9 |

As shown in Table 8, in addition to identification information of 2 transmit beams included in each of 4 groups of transmit beams, the information about the selected G groups of transmit beams further includes channel quality of each transmit beam in a group of transmit beams having the best average channel quality among the 4 groups of transmit beams and channel quality of each transmit beam in a group of transmit beams having the worst average channel quality among the 4 groups of transmit beams.

As described above, Table 4 to Table 8 show five examples of the information about the selected G groups of transmit beams. According to an embodiment of the present disclosure, the user equipment 100 may further receive information about the five reporting manners from the network side device. That is, the network side device may configure a reporting manner for the user equipment 100. Further, the user equipment 100 may further report a desired reporting manner to the network side device, so that the network side device may further configure a reporting manner according to the reporting of the user equipment 100. In addition, a default reporting manner may be agreed by the user equipment 100 and the network side device, so that the user equipment 100 performs the reporting in the default reporting manner in the case of not receiving the configured reporting manner from the network side device.

As described above, the information about the selected G groups of transmit beams may include the identification information of the N transmit beams included in each of the G groups of transmit beams, and may further include the channel quality information of all or part of the G groups of transmit beams. The network side device may configure the reporting manner for the user equipment according to actual conditions, so as to clearly represent channel quality of each transmit beam on a basis of saving signaling overhead.

According to an embodiment of the present disclosure, the information about the selected G groups of transmit beams may further include order information of the G groups of transmit beams. The order information may be determined according to the average channel quality of the G groups of transmit beams. That is, the user equipment 100 may successively report the information about the selected G groups of transmit beams to the network side device in a descending order of excellence in the average channel quality. That is, in each of examples shown in Table 4 to Table 8, the order of the transmit beams listed in the table may be a reporting order.

In addition, according to an embodiment of the present disclosure, identification of a transmit beam may be represented by identification of a CSI-RS (Channel State Information-Reference Signal) resource or identification of an SSB (Synchronization Signal Block) resource. This is because that, for different transmit beams, the CSI-RS is transmitted using different resources. That is, transmit beams are in one-to-one correspondence with CSI-RS resources. In this case, the identification of the transmit beam may be represented by the identification of the CSI-RS resource Similar to the case of transmitting the CSI-RS, for different beams, the SSB is transmitted using different resources. That is, transmit beams are in one-to-one correspondence with SSB resources. In this case, the identification of the transmit beam may be represented by the identification of the SSB resource. Similarly, identification of a set of transmit beams may be represented by identification of a set of CSI-RS resources or identification of a set of SSB resources.

Further, according to an embodiment of the present disclosure, the reported channel quality may be an absolute value of the channel quality or a relative value of the channel quality. For example, the user equipment 100 may only report an absolute value of channel quality of one transmit beam (reference transmit beam) or an absolute value of average channel quality of one group of transmit beams (reference group of transmit beams). For channel quality of other transmit beams or average channel quality of other groups of transmit beams, the user equipment 100 may only report a relative value relative to the reference transmit beam or the reference group of transmit beams. In this way, signaling overhead can be further saved.

As described above, the configuration unit 120 may configure the information about the selected G groups of transmit beams. the information about the selected G groups of transmit beams may be transmitted to the network side device via the communication unit 130.

According to an embodiment of the present disclosure, the user equipment 100 may carry the information about the selected G groups of transmit beams by using one CSI (Channel State Information) report. That is, the user equipment 100 may report the information about the selected G groups of transmit beams at one time (i.e., simultaneously).

Table 9 shows an example of the CSI report. In Table 9, the case of N=2 and G=2 is shown.

TABLE 9

| Serial Number of CSI Report | CSI Content |
|---|---|
| n | Identification #1 of a set of CSI-RS resources or a set of SSB resources, identification #1 of a CSI-RS resource or an SSB resource |
| | Identification #2 of a set of CSI-RS resources or a set of SSB resources, identification #2 of a CSI-RS resource or an SSB resource |
| | Identification #3 of a set of CSI-RS resources or a set of SSB resources, identification #3 of a CSI-RS resource or an SSB resource |
| | Identification #4 of a set of CSI-RS resources or a set of SSB resources, identification #4 of a CSI-RS resource or an SSB resource |
| | Channel quality #1 (if required to be reported) |
| | Channel quality #2 (if required to be reported) |
| | Channel quality #3 (if required to be reported) |
| | Channel quality #4 (if required to be reported) |

As shown in Table 9, n represents a serial number of the CSI report. The content of the CSI report may include identification information of 4 transmit beams in 2 groups of transmit beams. A transmit beam represented by Identification #1 of a set of CSI-RS resources or a set of SSB resources, identification #1 of a CSI-RS resource or an SSB resource and a transmit beam represented by Identification #2 of a set of CSI-RS resources or a set of SSB resources, identification #2 of a CSI-RS resource or an SSB resource and a transmit beam represented by are in one group of transmit beams. A transmit beam represented by Identification #3 of a set of CSI-RS resources or a set of SSB resources, identification #3 of a CSI-RS resource or an SSB resource and a transmit beam represented by Identification #4 of a set of CSI-RS resources or a set of SSB resources, identification #4 of a CSI-RS resource or an SSB resource and a transmit beam represented by are in the other group of transmit beams. In addition, the content of the CSI report may further include channel quality information of all or part of the 4 transmit beams if required.

According to an embodiment of the present disclosure, a serial number of a group of transmit beams may not be reported. This is because that identification information of all transmit beams included in the G groups of transmit beams is successively reported in the CSI report in an order. That is, in the example shown in Table 9, the first two transmit beams are in the one group of transmit beams, and the last two transmit beams are in the other group of transmit beams. Further, the network side device may configure values of G and N. That is, the network side device knows the values of G and N. Therefore, the network side device may determine transmit beams included in each group of transmit beams according to the content of the CSI report. In this way, overhead of the CSI report can be further saved. In addition, Table 9 only shows an example in which the CSI report includes channel quality information of transmit beams included in the reported group of transmit beams. As described above, the CSI report may include average channel quality information of the group of transmit beams.

According to an embodiment of the present disclosure, after reporting the information about the selected G groups of transmit beams to the network side device, the user equipment 100 may receive control information from the network side device via the communication unit 130.

As shown in FIG. 1, according to an embodiment of the present disclosure, the user equipment 100 may further include a determination unit 150 configured to determine, according to the received control information, a group of transmit beams or a transmit beam for transmitting downlink information selected by the network side device.

According to an embodiment of the present disclosure, after the user equipment 100 reports the information about the G groups of transmit beams, the network side device may select a group of transmit beams from the G groups of transmit beams, to simultaneously transmit downlink information using multiple transmit beams in the group of transmit beams. Further, the network side device may further select a transmit beam in a group of transmit beams from the G groups of transmit beams, to transmit downlink information only using the transmit beam.

According to an embodiment of the present disclosure, downlink information transmitted by the network side device using a transmit beam or a group of transmit beams may include downlink control information or downlink data information. The following description is given respectively for the downlink control information and the downlink data information.

According to an embodiment of the present disclosure, the communication unit 130 may receive the control information by DCI (Downlink Control Information). The determination unit 150 may demodulate from the DCI, a group of transmit beams or a transmit beam for transmitting downlink data information selected by the network side device. That is, the determination unit 150 may determine a group of transmit beams or a transmit beam carrying a PDSCH channel according to the DCI.

According to an embodiment of the present disclosure, the communication unit 130 may further receive the control information by MAC (medium access control) layer signaling including but not limited to an MAC CE (Control Element). The determination unit 150 may demodulate from the MAC CE, a group of transmit beams or a transmit beam for transmitting downlink control information selected by the network side device. That is, the determination unit 150 may determine a group of transmit beams or a transmit beam carrying a PDCCH channel according to the MAC CE.

A case that the network side device selects a transmit beam and a case that the network side device selects a group of transmit beams are respectively described below.

In the case that the network side device selects a group of transmit beams, the determination unit 150 may demodulate from the DCI, identification (i.e., a serial number) of a group of transmit beams for transmitting downlink data information. Further, the determination unit 150 may demodulate from the MAC CE, identification (i.e., a serial number) of a group of transmit beams for transmitting downlink control information. That is, the serial number of the group of transmit beams for transmitting the downlink data information is carried in the DCI, and the serial number of the group of transmit beams for transmitting the downlink control information is carried in the MAC CE.

As described above, the information about the G groups of transmit beams may not include serial number information of the groups of transmit beams. When demodulating a serial number of a group of transmit beams, the determination unit 150 may determine which group of transmit beams is selected by the network side device according to an order in which the G groups of transmit beams are reported. For example, in the example shown in Table 9, when demodulating a serial number of a group of transmit beams is 1, the determination unit 150 may determine that the network side device selects a group of transmit beams including the following transmit beams: the transmit beam represented by Identification #1 of a set of CSI-RS resources or a set of SSB resources, identification #1 of a CSI-RS resource or an SSB resource; and the transmit beam represented by Identification #2 of a set of CSI-RS resources or a set of SSB resources, identification #2 of a CSI-RS resource or an SSB resource. When demodulating a serial number of a group of transmit beams is 2, the determination unit 150 may determine that the network side device selects a group of transmit beams including the following transmit beams: the transmit beam represented by Identification #3 of a set of CSI-RS resources or a set of SSB resources, identification #3 of a CSI-RS resource or an SSB resource; and the transmit beam represented by Identification #4 of a set of CSI-RS resources or a set of SSB resources, identification #4 of a CSI-RS resource or an SSB resource.

According to an embodiment of the present disclosure, after the determination unit 150 determines the group of transmit beams for transmitting the downlink control information or the downlink data information by the network side device, a corresponding receiving beam may be used to receive the downlink control information or the downlink data information.

In the case that the network side device selects a transmit beam, the determination unit 150 may demodulate TCI (Transmission Configuration Indication) state information from the DCI or the MAC CE, and determine a transmit beam for transmitting downlink data information or downlink control information according to the TCI state information. Specifically, the determination unit 150 may demodulate the TCI state information from the DCI, and extract identification information of a transmit beam for transmitting downlink data information from the TCI state information. The identification information of the transmit beam for transmitting the downlink data information includes: identification of a set of transmit beams where the transmit beam lies, such as identification of a set of CSI-RS resources or identification of a set of SSB resources, and identification of the transmit beam in the set of transmit beams, such as identification of a CSI-RS resource or identification of an SSB resource. The determination unit 150 may demodulate the TCI state information from the MAC CE, and extract identification information of a transmit beam for transmitting downlink control information from the TCI state information. The identification information of the transmit beam for transmitting the downlink control information includes: identification of a set of transmit beams where the transmit beam lies, such as identification of a set of CSI-RS resources or identification of a set of SSB resources, and identification of the transmit beam in the set of transmit beams, such as identification of a CSI-RS resource or identification of an SSB resource.

According to an embodiment of the present disclosure, after the determination unit 150 determines the transmit beam for transmitting the downlink control information or the downlink data information by the network side device, a corresponding receiving beam may be used to receive the downlink control information or the downlink data information.

It can be seen that, the user equipment 100 according to the embodiment of the present disclosure may select multiple groups of transmit beams from transmit beams of the network side device and transmit information about the multiple groups of transmit beams to the network side device. In this way, the multiple groups of transmit beams can be reported at one time, thereby reducing signaling overhead. Further, in the process of selecting a transmit beam by the user equipment 100, one or more parameters representing the channel quality may be used so that the selected group of transmit beams has good channel quality. In summary, with the user equipment 100 according to the embodiment of the present disclosure, the beam selection in a system to which the beamforming technology is applied can be improved.

Figure 5:
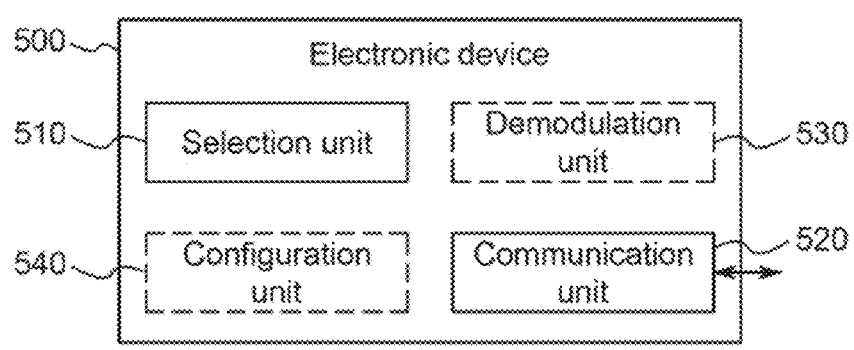
FIG. 5 is a block diagram showing a configuration example of an electronic device as a network side device according to an embodiment of the present disclosure.

FIG. 5 is a block diagram showing a structure of an electronic device 500 as a network side device in a wireless communication system according to an embodiment of the present disclosure. As shown in FIG. 5, the electronic device 500 may include a selection unit 510 and a communication unit 520.

The units of the electronic device 500 may be included in a processing circuitry. It should be noted that the electronic device 500 may include one processing circuitry or multiple processing circuitries. Further, the processing circuitry may include various discrete functional units to perform various functions and/or operations. It should be noted that the functional units may be physical entities or logical entities, and units with different names may be implemented by the same physical entity.

According to an embodiment of the present disclosure, the communication unit 520 may receive information about G groups of transmit beams from a user equipment.

According to an embodiment of the present disclosure, the selection unit 150 may select a group of transmit beams or a transmit beam for transmitting do wnlink information from the G groups of transmit beams.

Each of the G groups of transmit beams includes N transmit beams. The user equipment can simultaneously receive downlink information transmitted by the electronic device 500 using the N transmit beams. Each of N and G is an integer greater than 1.

It can be seen from the above that, the electronic device 500 according to the embodiment of the present disclosure may select a group of transmit beams or a transmit beam based on information about multiple groups of transmit beams transmitted by the user equipment, so that the selected group of transmit beams is proper, thereby improving beam selection in a system to which the beamforming technology is applied.

According to an embodiment of the present disclosure, the electronic device 500 may configure values of G and N for the user equipment. For example, the electronic device 500 may configure values of G and/or N for the user equipment 100 by high layer signaling including but not limited to RRC signaling. In addition, the electronic device 500 may dynamically change the values of G and/or N configured for the user equipment by low layer signaling including but not limited to DCI information.

According to an embodiment of the present disclosure, the electronic device 500 may further transmit information about K transmit beams and C sets of transmit beams to the user equipment, so that the user equipment selects G groups of beam beams from the K transmit beams in the C sets of transmit beams. For example, the electronic device 500 may transmit the information about the K transmit beams and the C sets of transmit beams to the user equipment by high layer signaling.

As shown in FIG. 5, according to an embodiment of the present disclosure, the electronic device 500 may further include a demodulation unit 530 configured to demodulate the information about the G groups of transmit beams received from the user equipment.

According to an embodiment of the present disclosure, the demodulation unit 530 may demodulate the information about the G groups of transmit beams, to determine identification information of the N transmit beams included in each of the G groups of transmit beams. Identification information of each transmit beam may include: identification information of a set of transmit beams where the transmit beam lies, and identification information of the transmit beam in the set of transmit beams.

According to an embodiment of the present disclosure, the demodulation unit 530 may further demodulate the information about the G groups of transmit beams, to determine channel quality information of all or part of the G groups of transmit beams. Channel quality information of each of the all or part of the G groups of transmit beams may include: channel quality of each of the N transmit beams included in the group of transmit beams, or average channel quality of the group of transmit beams.

According to an embodiment of the present disclosure, the demodulation unit 530 may further demodulate the information about the G groups of transmit beams, to determine an order of the G groups of transmit beams. For example, the electronic device 500 and the user equipment may agree that the G groups of transmit beams are ranked in a descending order of excellence in average channel quality of the G groups of transmit beams.

According to an embodiment of the present disclosure, the electronic device 500 may further configure a reporting manner for the user equipment, i.e., configure for the user equipment what information is included in the information about the G groups of transmit beams. For example, the electronic device 500 may select one reporting manner from the following five reporting manners: reporting identification information of N transmit beams included in each of the G groups of transmit beams; reporting the identification information of N transmit beams included in each of the G groups of transmit beams and average channel quality of all of the G groups of transmit beams; reporting the identification information of N transmit beams included in each of the G groups of transmit beams and channel quality of each of N transmit beams included in all of the G groups of transmit beams; reporting the identification information of N transmit beams included in each of the G groups of transmit beams and average channel quality of part of the G groups of transmit beams; and reporting the identification information of N transmit beams included in each of the G groups of transmit beams and channel quality of each of N transmit beams included in part of the G groups of transmit beams.

Further, the electronic device 500 may further receive, from the user equipment, a reporting manner desired by the user equipment, and configure a reporting manner for the user equipment according to actual conditions.

According to an embodiment of the present disclosure, the electronic device 500 may receive one CSI report from the user equipment, to acquire information about G groups of transmit beams. That is, the information about the G groups of transmit beams is received in one CSI report at one time (i.e., simultaneously).

According to an embodiment of the present disclosure, the selection unit 510 may select a proper group of transmit beams or a proper transmit beam according to information demodulated by the demodulation unit 530. That is, the selection unit 510 may select a group of transmit beams to simultaneously transmit downlink information to the user equipment using N transmit beams included in the group of transmit beams. Further, the selection unit 510 may also select one transmit beam in a group of transmit beams to transmit downlink information to the user equipment using the transmit beam.

According to an embodiment of the present disclosure, the selection unit 510 may select a group of transmit beams having the best average channel quality or a transmit beam having the best channel quality. However, the present disclosure is not limited thereto. The selection unit 510 may also select a proper group of transmit beams or a proper transmit beam considering, for example, configuration information of a transmit beam in an adjacent cell.

According to an embodiment of the present disclosure, after selecting a proper transmit beam or a proper group of transmit beams by the selection unit 510, it is required to inform the user equipment of the selected transmit beam or the selected group of transmit beams. The electronic device 500 may carry information about the transmit beam or the group of transmit beams by control information.

As shown in FIG. 5, according to an embodiment of the present disclosure, the electronic device 500 may further include a configuration unit 540 configured to configure control information. The control information includes information about a selected group of transmit beams or a selected transmit beam for transmitting downlink information. Further, the electronic device 500 may transmit the control information to the user equipment via the communication unit 520.

According to an embodiment of the present disclosure, the downlink information transmitted by the electronic device 500 using a group of transmit beams or a transmit beam may include downlink control information and downlink data information. The following description is given respectively for the downlink control information and the downlink data information.

According to an embodiment of the present disclosure, the configuration unit 540 may carry control information by using the DCI. The control information carries information about the selected group of transmit beams or the selected transmit beam for transmitting the downlink data information.

According to an embodiment of the present disclosure, the configuration unit 540 may carry the control information by MAC layer signaling including but not limited to an MAC CE. The control information includes information about the selected group of transmit beams or the selected transmit beam for transmitting the downlink control information.

A case that the electronic device 500 selects a transmit beam and a case that the electronic device 500 selects a group of transmit beams are respectively described below.

In the case that the electronic device 500 selects a group of transmit beams, the configuration unit 540 may carry the control information about the selected group of transmit beams for transmitting downlink data information with DCI format 1_1. Specifically, the control information may include identification of the selected group of transmit beams for transmitting the downlink control information.

As described above, the information about the G groups of transmit beams received by the electronic device 500 may not include serial number information of the groups of transmit beams. The electronic device 500 may determine a serial number (that is, identification) of a group of transmit beams according to an order in which the G groups of transmit beams are reported. For example, in the example shown in Table 9, in the case of successively receiving the following transmit beams: the transmit beam represented by Identification #1 of a set of CSI-RS resources or a set of SSB resources, identification #1 of a CSI-RS resource or an SSB resource; the transmit beam represented by Identification #2 of a set of CSI-RS resources or a set of SSB resources, identification #2 of a CSI-RS resource or an SSB resource; the transmit beam represented by Identification #3 of a set of CSI-RS resources or a set of SSB resources, identification #3 of a CSI-RS resource or an SSB resource; and the transmit beam represented by Identification #4 of a set of CSI-RS resources or a set of SSB resources, identification #4 of a CSI-RS resource or an SSB resource, the electronic device 500 may determine that, the first two transmit beams are in the same group of transmit beams, and the last two transmit beams are in the same group of transmit beams. Therefore, the electronic device 500 may determine that, a serial number of the group of transmit beams consisting of the first two transmit beams is 1, and a serial number of the group of transmit beams consisting of the last two transmit beams is 2. Therefore, in a case that the electronic device 500 selects the group of transmit beams having the serial number 1, the serial number 1 is encoded into the control information. In a case that the electronic device 500 selects the group of transmit beams having the serial number 2, the serial number 2 is encoded into the control information.

According to an embodiment of the present disclosure, the DCI format 1_1 may be modified to include a GBBI (Group based beam indication). The GBBI represents a serial number of a group of transmit beams for transmitting the downlink data information selected by the electronic device 500. For example, the serial number of the group of transmit beams may be represented by a binary number, and a number of bits of the binary number may be determined according to a value of the G. For example, in the case of G=4, the GBBI may be expressed by two bits. A code of the modified DCI format 1_1 is as follow, where expressing the serial number of the group of transmit beams by two bits is merely exemplary.

The DCI format 1_1 with CRC scrambled by C-RNTI (TS 38.212)

Carrier indicator—0 or 3 bits

. . .

Group based beam indication (GBBI)—beam group id, 2 bits.

. . .

In the case that the electronic device 500 selects a group of transmit beams, the configuration unit 540 may carry the control information about the selected group of transmit beams for transmitting downlink control information using an MAC CE. Specifically, the control information may include identification of the selected group of transmit beams for transmitting the downlink control information. Similarly, the MAC CE may be modified to include a GBBI (Group based beam indication). The GBBI represents a serial number of a group of transmit beams for transmitting the downlink control information selected by the electronic device 500.

In the case that the electronic device 500 selects a transmit beam, the configuration unit 540 may carry TCI state information using the DCI or the MAC CE. The TCI state information includes a transmit beam for transmitting the downlink data information or the downlink control information. Specifically, the configuration unit 540 may configure the TCI state information included in the DCI to carry identification information of a transmit beam for transmitting downlink data information. The identification information of the transmit beam for transmitting the downlink data information includes: identification of a set of transmit beams where the transmit beam lies, such as identification of a set of CSI-RS resources or identification of a set of SSB resources, and identification of the transmit beam in the set of transmit beams, such as identification of a CSI-RS resource or identification of an SSB resource. Further, the configuration unit 540 may configure the TCI state information included in the MAC CE to carry identification information of a transmit beam for transmitting downlink control information. The identification information of the transmit beam for transmitting the downlink control information includes: identification of a set of transmit beams where the transmit beam lies, such as identification of a set of CSI-RS resources or identification of a set of SSB resources, and identification of the transmit beam in the set of transmit beams, such as identification of a CSI-RS resource or identification of an SSB resource.

A code of the modified TCI state information is as follows, where NZP-CSI-RS-Resource-SetId represents the identification of the set of transmit beams where the transmit beam lies, i.e., the identification of the set of CSI-RS resources, and NZP-CSI-RS-ResourceId represents the identification of the transmit beam in the set of transmit beams, i.e., the identification of the CSI-RS resource.

```
TCI-State ::=          SEQUENCE {
    tci-StateId            TCI-StateId,
    ...
}
QCL-Info ::=           SEQUENCE {
    cell                   ServCellIndex       OPTIONAL,
    bwp-Id                 BWP-Id              OPTIONAL,
    referenceSignal        CHOICE {
        csi-rs                 NZP-CSI-RS-Resource-SetId &
NZP-CSI-RS-ResourceId,
        ssb                    SSB-Index,
```

As described above, the configuration unit 540 may carry the information about the selected group of transmit beams or the selected transmit beam for transmitting the downlink information using the DCI or the MAC CE, so that the user equipment can know the group of transmit beams or the transmit beam to be used by the network side device, so as to select a proper receiving beam.

According to an embodiment of the present disclosure, in the case of the electronic device 500 selecting a group of transmit beams, since multiple transmit beams in the group of transmit beams are emitted by different antenna panels of the electronic device 500, the electronic device 500 may simultaneously transmit the downlink information to the user equipment using the multiple transmit beams in the group of transmit beams, thereby increasing transmitting efficiency.

It can be seen from the above that, the electronic device 500 according to the embodiment of the present disclosure may select a group of transmit beams or a transmit beam based on information about multiple groups of transmit beams transmitted by the user equipment, so that the selected group of transmit beams is proper. In addition, the electronic device 500 may further configure one of multiple reporting manners for the user equipment. Further, the electronic device 500 may simultaneously transmit the downlink information to the user equipment using multiple transmit beams in the group of transmit beams, thereby increasing transmitting efficiency. In summary, with the electronic device 500 according to the embodiment of the present disclosure, the beam selection in a system to which the beamforming technology is applied can be improved.

The electronic device 500 according to the embodiment of the present disclosure may serve as the network side device. That is, the electronic device 500 may serve the user equipment 100. Therefore, all embodiments of the user equipment 100 described above are applicable here.

A wireless communication method performed by the user equipment 100 in a wireless communication system according to an embodiment of the present disclosure is described in detail below.

Figure 6:
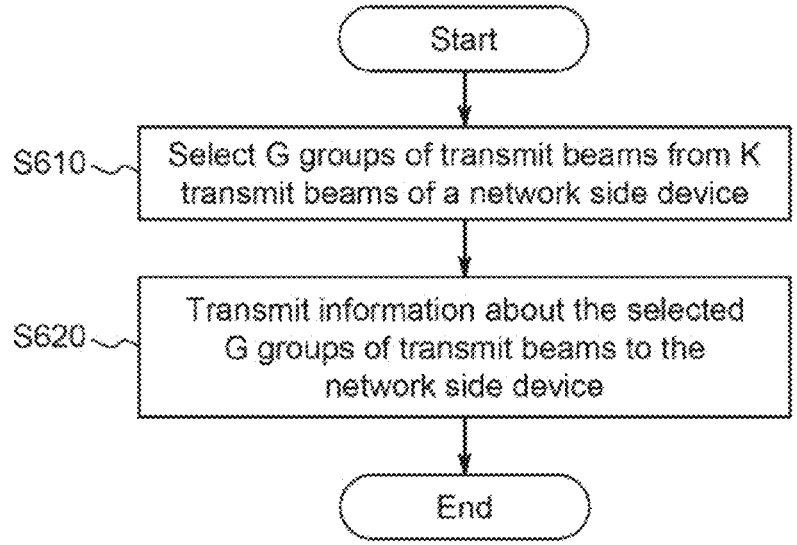
FIG. 6 is a flowchart of a wireless communication method performed by a user equipment according to an embodiment of the present disclosure.

FIG. 6 is a flowchart of the wireless communication method performed by the user equipment 100 in a wireless communication system according to the embodiment of the present disclosure.

As shown in FIG. 6, in step S610, G groups of transmit beams are selected from K transmit beams of a network side device.

Next, in step S620, information about the selected G groups of transmit beams is transmitted to the network side device.

Each of the G groups of transmit beams includes N transmit beams. The user equipment is capable of simultaneously receiving downlink information transmitted by the network side device using the N transmit beams. Each of K, N and G is an integer greater than 1.

Preferably, the selecting G groups of transmit beams includes: selecting the G groups of transmit beams according to C sets of transmit beams of the network side device so that each group of transmit beams includes N transmit beams which are respectively from N sets of transmit beams. C is an integer greater than or equal to N.

Preferably, each of the C sets of transmit beams includes all transmit beams emitted by one or more antenna panels of the network side device.

Preferably, the selecting G groups of transmit beams includes: selecting the G groups of transmit beams according to channel quality between the K transmit beams of the network side device and the user equipment.

Preferably, the wireless communication method further includes: determining, according to a mean value of channel quality between each transmit beam and the user equipment within a predetermined period of time, channel quality between the transmit beam and the user equipment.

Preferably, the selecting G groups of transmit beams includes: determining all groups of transmit beams according to the C sets of transmit beams of the network side device, determining average channel quality of each group of transmit beams according to channel quality between the N transmit beams included in each group of transmit beams and the user equipment; and selecting the G groups of transmit beams according to the average channel quality of each group of transmit beams.

Preferably, the information about the selected G groups of transmit beams includes: identification information of the N transmit beams included in each of the G groups of transmit beams.

Preferably, identification information of each transmit beam includes: identification information of a set of transmit beams where the transmit beam lies, and identification information of the transmit beam in the set of transmit beams.

Preferably, the information about the selected G groups of transmit beams further includes: channel quality information of all or part of the G groups of transmit beams.

Preferably, the channel quality information of the group of transmit beams includes: channel quality of each of the N transmit beams included in the group of transmit beams; or average channel quality of the group of transmit beams.

Preferably, the wireless communication method further includes: representing the channel quality by one or more of: Reference Signal Receiving Power RSRP, Reference Signal Receiving Quality RSRQ, and Signal to Interference plus Noise Ratio SINR.

Preferably, the wireless communication method further includes: receiving control information from the network side device; and determining, according to the control information, a group of transmit beams for transmitting downlink information selected by the network side device.

Preferably, the wireless communication method further includes: receiving the control information by Downlink Control Information DCI; and determining, according to the control information, a group of transmit beams for transmitting downlink data information selected by the network side device.

Preferably, the wireless communication method further includes: receiving the control information via Medium Access Control MAC layer signaling; and determining, according to the control information, a group of transmit beams for transmitting downlink control information selected by the network side device.

Preferably, the wireless communication method further includes: carrying the information about the selected G groups of transmit beams by using a Channel State Information CSI report.

According to an embodiment of the present disclosure, a subject performing the above method may be the user equipment 100 according to the embodiment of the present disclosure. Therefore, all embodiments of the user equipment 100 described above are applicable here.

A wireless communication method performed by the electronic device 500 serving as a network side device in a wireless communication system according to an embodiment of the present disclosure is described in detail below.

Figure 7:
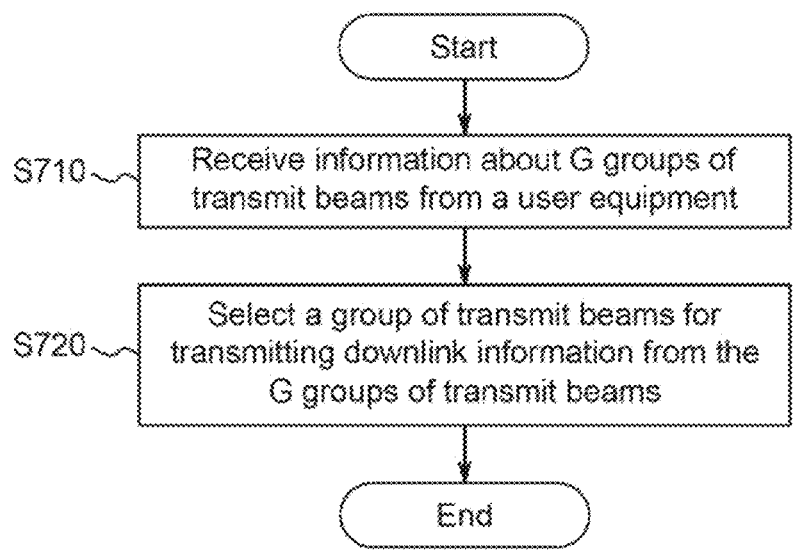
FIG. 7 is a flowchart of a wireless communication method performed by a network side device according to an embodiment of the present disclosure.

FIG. 7 is a flowchart of the wireless communication method performed by the electronic device 500 serving as a network side device in a wireless communication system according to the embodiment of the present disclosure.

As shown in FIG. 7, in step S710, information about G groups of transmit beams is received from a user equipment.

Next, in step S720, a group of transmit beams for transmitting downlink information is selected from the G groups of transmit beams.

Each of the G groups of transmit beams includes N transmit beams. The user equipment is capable of simultaneously receiving downlink information transmitted by the electronic device using the N transmit beams. Each of N and G is an integer greater than 1.

Preferably, the wireless communication method further includes: determining, according to the information about the G groups of transmit beams, identification information of the N transmit beams included in each of the G groups of transmit beams.

Preferably, identification information of each transmit beam includes: identification information of a set of transmit beams where the transmit beam lies, and identification information of the transmit beam in the set of transmit beams.

Preferably, the wireless communication method further includes: determining, according to the information about the G groups of transmit beams, channel quality information of all or part of the G groups of transmit beams.

Preferably, channel quality information of a group of transmit beams includes: channel quality of each of the N transmit beams included in the group of transmit beams; or average channel quality of the group of transmit beams.

Preferably, the wireless communication method further includes: transmitting control information to the user equipment. The control information includes information about a selected group of transmit beams for transmitting downlink information.

Preferably, the wireless communication method further includes: transmitting the control information by Downlink Control Information DCI. The control information includes information about a selected group of transmit beams for transmitting downlink data information.

Preferably, the wireless communication method further includes: transmitting the control information by Medium Access Control MAC layer signaling. The control information includes information about a selected group of transmit beams for transmitting downlink control information.

Preferably, the wireless communication method further includes: receiving a Channel State Information CSI report from the user equipment to acquire the information about the G groups of transmit beams.

According to an embodiment of the present disclosure, a subject performing the above method may be the electronic device 500 according to the embodiment of the present disclosure. Therefore, all embodiments of the electronic device 500 described above are applicable here.

The technology of the present disclosure is applicable to various products.

The network side device may be implemented as any type of TRP. The TRP may have functions of transmitting and receiving. For example, the TRP may receive information from a user equipment and a base station device, and may transmit information to a user equipment and a base station device. In a typical example, the TRP may serve a user equipment and is controlled by a base station device. Further, TRP may have a structure similar to that of a base station device described below or only have a structure related to information transmitting and receiving in the base station device.

The network side device may also be implemented as any type of base station device, such as a macro eNB and a small eNB. The network side device may also be implemented as any type of gNB (a base station in a 5G system). The small eNB may be an eNB covering a cell smaller than a macro cell, such as a pico eNB, a micro eNB and a home (femto) eNB. Alternatively, the base station may be implemented as any other types of base station, such as a NodeB and a base transceiver station (BTS). The base station may include: a main body (also referred to as a base station device) configured to control wireless communication and one or more remote radio heads (RRH) arranged at different positions from the main body.

The user equipment may be implemented as a mobile terminal (such as a smartphone, a tablet personal computer (PC), a notebook PC, a portable game terminal, a portable/dongle mobile router, and a digital camera) or a vehicle terminal (such as a vehicle navigation device). The user equipment may also be implemented as a terminal (also referred to as a machine type communication (MTC) terminal) that performs machine-to-machine (M2M) communication. Furthermore, the user equipment may be a wireless communication module (such as an integrated circuit module including a single wafer) mounted on each of the user equipments described above.

Figure 8:
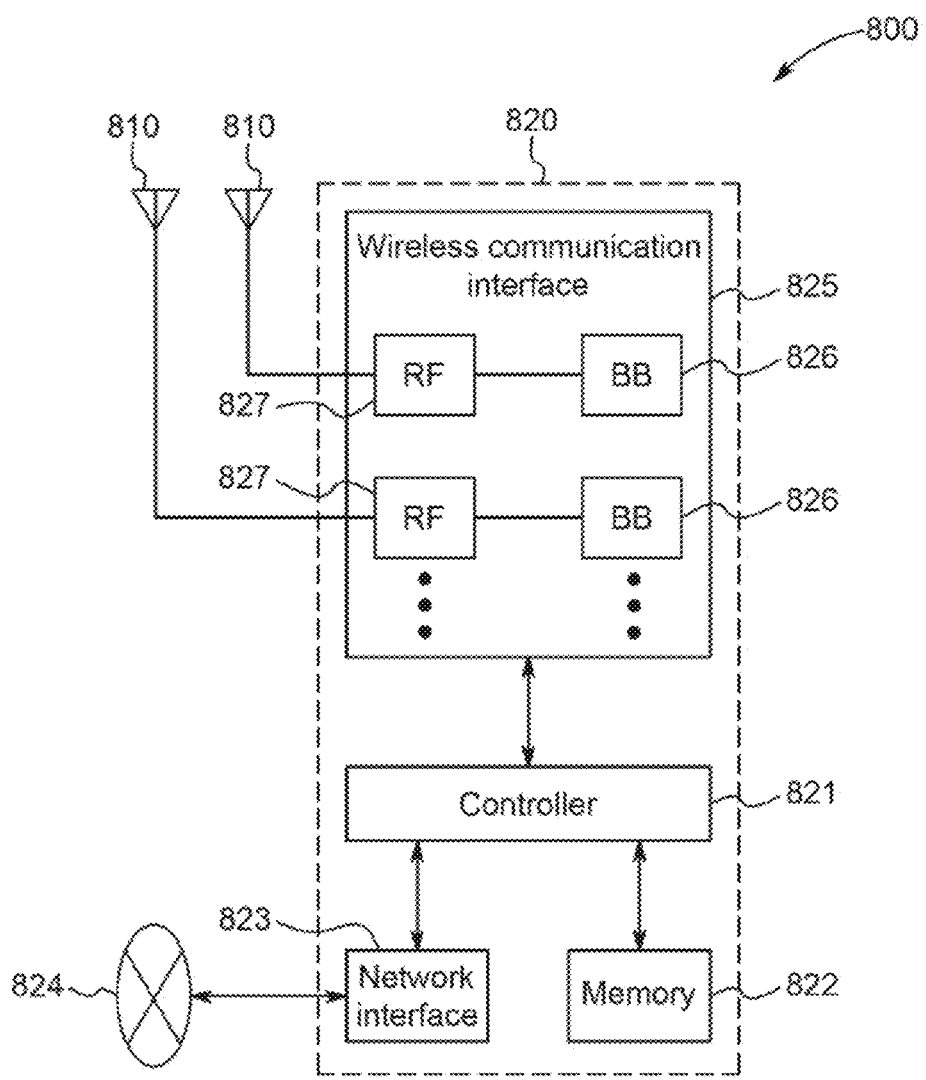
FIG. 8 is a block diagram showing a first example of an exemplary configuration of a gNB (base station device in a 5G system)

FIG. 8 is a block diagram showing a first example of an exemplary configuration of a gNB to which the technology of the present disclosure may be applied. A gNB 800 includes one or more antennas 810 and a base station device 820. Each of the antennas 810 is connected to the base station device 820 via an RF cable.

Each of the antennas 810 includes a single antenna element or multiple antenna elements (such as multiple antenna elements included in a multiple-input multiple-output (MIMO) antenna), and is used for the base station device 820 to transmit and receive a wireless signal. As shown in FIG. 8, the gNB 800 may include multiple antennas 810. For example, the multiple antennas 810 may be compatible with multiple frequency bands used by the gNB 800. Although FIG. 8 shows an example in which the gNB 800 includes multiple antennas 810, the gNB 800 may also include a single antenna 810.

The base station device 820 includes a controller 821, a memory 822, a network interface 823 and a wireless communication interface 825.

The controller 821 may be, for example, a CPU or a DSP, and operate various functions of a high layer of the base station device 820. For example, the controller 821 generates a data packet based on data in a signal processed by the wireless communication interface 825 and transmits the generated packet via the network interface 823. The controller 821 may bundle data from multiple baseband processors to generate a bundled packet and transmit the generated bundled packet. The controller 821 may have a logic function that performs control such as wireless resource control, wireless bearer control, mobility management, admission control, and scheduling. The control may be performed in combination with a nearby gNB or core network node. The memory 822 includes an RAM and an ROM, and stores a program executed by the controller 821 and various types of control data (such as a terminal list, transmission power data and scheduling data).

The network interface 823 is a communication interface via which the base station device 820 is connected to a core network 824. The controller 821 may communicate with a core network node or another gNB via the network interface 823. In this case, the gNB 800 may be connected to the core network node or another gNB via a logical interface (such as an interface S1 and an interface X2). The network interface 823 may also be a wired communication interface or a wireless communication interface for wireless backhaul line. If the network interface 823 is a wireless communication interface, the network interface 823 may use a frequency band for wireless communication higher than a frequency band used by the wireless communication interface 825.

The wireless communication interface 825 supports any cellular communication scheme (such as long term evolution (LTE), LTE-Advanced and NR (new radio)), and provides wireless connection to a terminal in a cell of the gNB 800 via an antenna 810. The wireless communication interface 825 may generally include, for example, a baseband (BB) processor 826 and a RF circuit 827. The BB processor 826 may perform, for example, encoding/decoding, modulating/demodulating and multiplexing/de-multiplexing, and various types of signal processing of layers (such as L1, medium access control (MAC), radio link control (RLC) and packet data convergence protocol (PDCP)). Instead of the controller 821, the BB processor 826 may have a part or all of the above logic functions. The BB processor 826 may be implemented as a memory storing a communication control program, or a module including a processor configured to execute a program and related circuit. The function of the BB processor 826 may be changed by updating the program. The module may be a card or blade inserted into a slot of the base station device 820. Alternatively, the module may be a chip mounted on the card or blade. Further, the RF circuit 827 may include, for example, a mixer, a filter or an amplifier, and transmits and receives a wireless signal via the antenna 810.

As shown in FIG. 8, the wireless communication interface 825 may include multiple BB processors 826. For example, the multiple BB processors 826 may be compatible with multiple frequency bands used by the gNB 800. As shown in FIG. 8, the wireless communication interface 825 may include multiple RF circuits 827. For example, the multiple RF circuits 827 may be compatible with multiple antenna elements. Although FIG. 8 shows an example in which the wireless communication interface 825 includes multiple BB processors 826 and multiple RF circuits 827, the wireless communication interface 825 may also include a single BB processor 826 or a single RF circuit 827.

Figure 9:
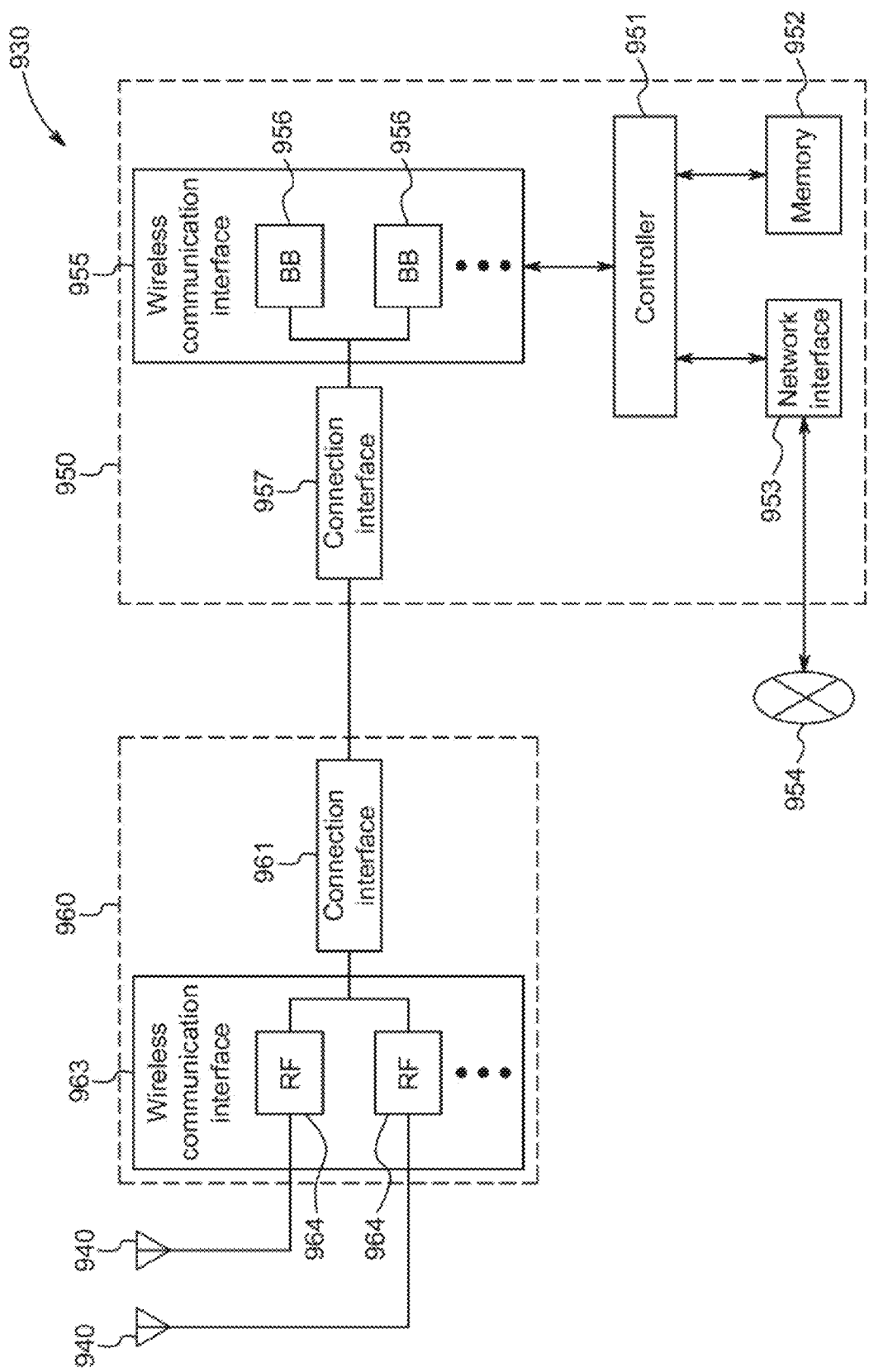
FIG. 9 is a block diagram showing a second example of the exemplary configuration of the gNB.

FIG. 9 is a block diagram showing a second example of an exemplary configuration of a gNB to which the technology of the present disclosure may be applied. A gNB 930 includes one or more antennas 940, a base station device 950, and an RRH 960. Each antenna 940 may be connected to the RRH 960 via an RF cable. The base station device 950 may be connected to the RRH 960 via a high speed line such as an optical fiber cable.

Each of the antennas 940 includes a single antenna element or multiple antenna elements (such as multiple antenna elements included in an MIMO antenna), and is used for the RRH 960 to transmit and receive a wireless signal. As shown in FIG. 9, the gNB 930 may include multiple antennas 940. For example, the multiple antennas 940 may be compatible with multiple frequency bands used by the gNB 930. Although FIG. 9 shows an example in which the gNB 930 includes multiple antennas 940, the gNB 930 may also include a single antenna 940.

The base station device 950 includes a controller 951, a memory 952, a network interface 953, a wireless communication interface 955, and a connection interface 957. The controller 951, the memory 952, and the network interface 953 are respectively the same as the controller 821, the memory 822, and the network interface 823 described with reference to FIG. 8.

The wireless communication interface 955 supports any cellular communication scheme (such as LTE, LTE-Advanced and NR), and provides wireless communication to a terminal in a sector corresponding to the RRH 960 via the RRH 960 and the antenna 940. The wireless communication interface 955 may generally include, for example, a BB processor 956. The BB processor 956 is the same as the BB processor 826 described with reference to FIG. 8, except that the BB processor 956 is connected to an RF circuit 964 of the RRH 960 via the connection interface 957. As shown in FIG. 9, the wireless communication interface 955 may include multiple BB processors 956. For example, the multiple BB processors 956 may be compatible with multiple frequency bands used by the gNB 930. Although FIG. 9 shows an example in which the wireless communication interface 955 includes multiple BB processors 956, the wireless communication interface 955 may also include a single BB processor 956.

The connection interface 957 is an interface for connecting the base station device 950 (the wireless communication interface 955) to the RRH 960. The connection interface 957 may also be a communication module for communication in the above high speed line via which the base station device 950 (wireless communication interface 955) is connected to the RRH 960.

The RRH 960 includes a connection interface 961 and a wireless communication interface 963.

The connection interface 961 is an interface for connecting the RRH 960 (the wireless communication interface 963) to the base station device 950. The connection interface 961 may also be a communication module for communication in the above high speed line.

The wireless communication interface 963 transmits and receives a wireless signal via the antenna 940. The wireless communication interface 963 may generally include, for example, an RF circuit 964. The RF circuit 964 may include, for example, a mixer, a filter, and an amplifier, and transmits and receives a wireless signal via the antenna 940. As shown in FIG. 9, the wireless communication interface 963 may include multiple RF circuits 964. For example, the multiple RF circuits 964 may support multiple antenna elements. Although FIG. 9 shows an example in which the wireless communication interface 963 includes multiple RF circuits 964, the wireless communication interface 963 may include a single RF circuit 964.

In the gNB 800 shown in FIG. 8 and the gNB 930 shown in FIG. 9, the selection unit 510, the demodulation unit 530, and the configuration unit 540 shown in FIG. 5 may be implemented by the controller 821 and/or the controller 851. At least a part of functions may also be implemented by the controller 821 and the controller 851. For example, the controller 821 and/or the controller 851 may perform the functions of selecting a group of transmit beams for transmitting downlink information, demodulating information about G groups of transmit beams and configuring control information by executing instructions stored in a corresponding memory.

Figure 10:
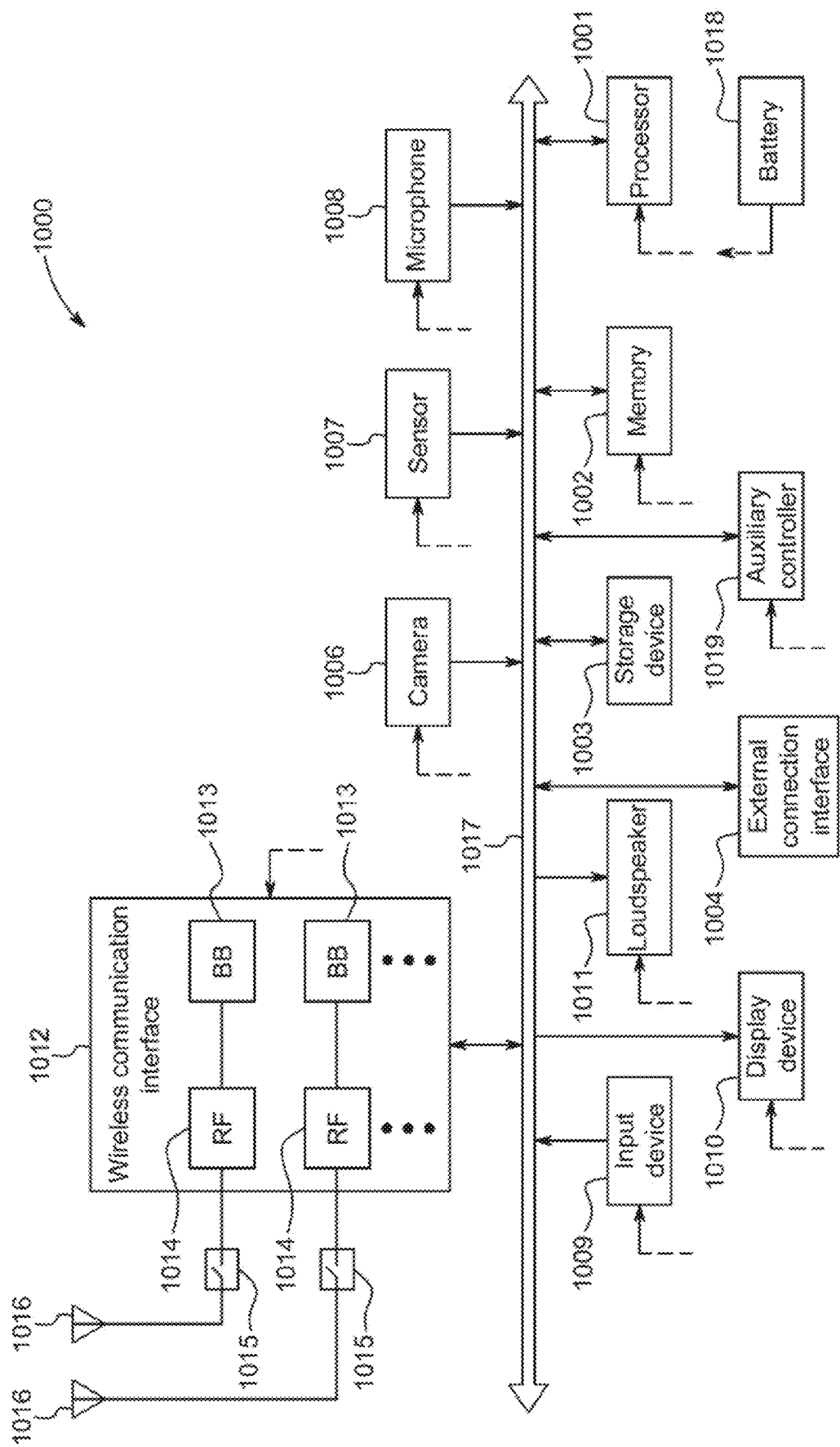
FIG. 10 is a block diagram showing an example of an exemplary configuration of a smartphone.

FIG. 10 is a block diagram showing an example of an exemplary configuration of a smartphone 1000 to which technology of the present disclosure may be applied. The smartphone 1000 includes a processor 1001, a memory 1002, a storage device 1003, an external connection interface 1004, a camera 1006, a sensor 1007, a microphone 1008, an input device 1009, a display device 1010, a loudspeaker 1011, a wireless communication interface 1012, one or more antenna switches 1015, one or more antennas 1016, a bus 1017, a battery 1018 and an auxiliary controller 1019.

The processor 1001 may be, for example, a CPU or a system on chip (SoC), and controls functions of an application layer and another layer of the smartphone 1000. The memory 1002 includes an RAM and an ROM, and stores a program executed by the processor 1001 and data. The storage device 1003 may include a storage medium such as a semiconductor memory and a hard disk. The external connection interface 1004 is an interface for connecting an external device (such as a memory card and a universal serial bus (USB) device) to the smartphone 1000.

The camera 1006 includes an image sensor (such as a charge coupled device (CCD) and a complementary metal oxide semiconductor (CMOS)), and generates a captured image. The sensor 1007 may include a group of sensors such as a measurement sensor, a gyro sensor, a geomagnetic sensor, and an acceleration sensor. The microphone 1008 converts sound that is inputted to the smartphone 1000 into an audio signal. The input device 1009 includes, for example, a touch sensor configured to detect a touch on a screen of the display device 1010, a keypad, a keyboard, a button, or a switch, and receives an operation or information inputted by a user. The display device 1010 includes a screen (such as a liquid crystal display (LCD) and an organic light-emitting diode (OLED) display), and displays an output image of the smartphone 1000. The loudspeaker 1011 is configured to convert an audio signal outputted from the smartphone 1000 into sound.

The wireless communication interface 1012 supports any cellular communication scheme (such as LTE, LTE-Advanced and NR), and performs wireless communication. The wireless communication interface 1012 may generally include, for example, a BB processor 1013 and an RF circuit 1014. The BB processor 1013 may perform, for example, coding/decoding, modulating/demodulating and multiplexing/de-multiplexing, and various signal processing for wireless communication. The RF circuit 1014 may include, for example, a mixer, a filter and an amplifier, and transmits and receives a wireless signal via an antenna 1016. The wireless communication interface 1012 may be a chip module having the BB processor 1013 and the RF circuit 1014 integrated thereon. As shown in FIG. 10, the wireless communication interface 1012 may include multiple BB processors 1013 and multiple RF circuits 1014. Although FIG. 10 shows an example in which the wireless communication interface 1012 includes the multiple BB processors 1013 and the multiple RF circuits 1014, the wireless communication interface 1012 may also include a single BB processor 1013 or a single RF circuit 1014.

Besides the cellular communication scheme, the wireless communication interface 1012 may support other type of wireless communication scheme, such as a short-distance wireless communication scheme, a near field communication scheme and a wireless local area network (LAN) scheme. In this case, the wireless communication interface 1012 may include the BB processor 1013 and the RF circuit 1014 for each wireless communication scheme.

Each of the antenna switches 1015 switches a connection destination of the antenna 1016 among multiple circuits (such as circuits for different wireless communication schemes) included in the wireless communication interface 1012.

Each of the antennas 1016 includes a single antenna element or multiple antenna elements (such as multiple antenna elements included in an MIMO antenna), and is used for the wireless communication interface 1012 to transmit and receive a wireless signal. As shown in FIG. 10, the smartphone 1000 may include multiple antennas 1016. Although FIG. 10 shows an example in which the smartphone 1000 includes multiple antennas 1016, the smartphone 1000 may also include a single antenna 1016.

In addition, the smartphone 1000 may include an antenna 1016 for each type of wireless communication scheme. In this case, the antenna switches 1015 may be omitted in the configuration of the smartphone 1000.

The processor 1001, the memory 1002, the storage device 1003, the external connection interface 1004, the camera 1006, the sensor 1007, the microphone 1008, the input device 1009, the display device 1010, the loudspeaker 1011, the wireless communication interface 1012, and the auxiliary controller 1019 are connected to each other via the bus 1017. The battery 1018 supplies power to blocks of the smartphone 1000 shown in FIG. 10 via feeders that are partially shown with dashed lines in the drawings. The auxiliary controller 1019, for example, operates a minimum necessary function of the smartphone 1000 in a sleep mode.

In the smartphone 1000 shown in FIG. 10, the selection unit 110, the configuration unit 120, the detection unit 140 and the determination unit 150 shown in FIG. 1 may be implemented by the processor 1001 or the auxiliary controller 1019. At least a part of functions may also be implemented by the processor 1001 or the auxiliary controller 1019. For example, the processor 1001 or the auxiliary controller 1019 may perform the functions of: selecting G groups of transmit beams, configuring information about the selected G groups of transmit beams, detecting channel quality, and determining a group of transmit beams selected by a network side device by executing instructions stored in the memory 1002 or the storage device 1003.

Figure 11:
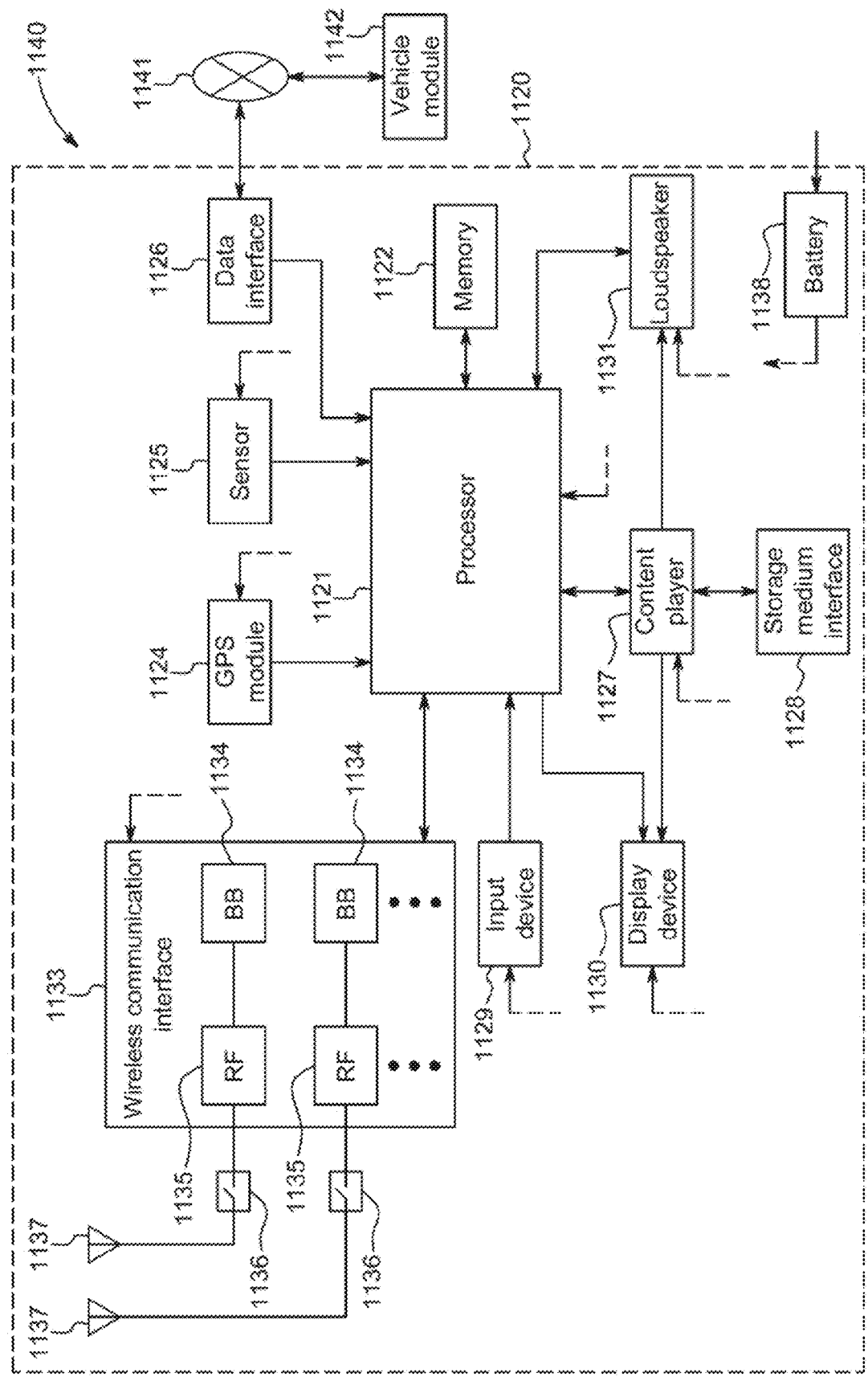
FIG. 11 is a block diagram showing an example of an exemplary configuration of a vehicle navigation device.

FIG. 11 is a block diagram showing an example of an exemplary configuration of a vehicle navigation device 1120 to which the technology of the present disclosure may be applied. The vehicle navigation device 1120 includes a processor 1121, a memory 1122, a global positioning system (GPS) module 1124, a sensor 1125, a data interface 1126, a content player 1127, a storage medium interface 1128, an input device 1129, a display device 1130, a loudspeaker 1131, a wireless communication interface 1133, one or more antenna switches 1136, one or more antennas 1137, and a battery 1138.

The processor 1121 may be, for example, a CPU or SoC, and controls a navigation function and another function of the vehicle navigation device 1120. The memory 1122 includes an RAM and an ROM, and stores a program executed by the processor 1121 and data.

The GPS module 1124 uses a GPS signal received from a GPS satellite to measure a position (such as a latitude, a longitude, and an altitude) of the vehicle navigation device 1120. The sensor 1125 may include a group of sensors such as a gyro sensor, a geomagnetic sensor, and an air pressure sensor. The data interface 1126 is connected to, for example, a vehicle network 1141 via a terminal that is not shown, and acquires data (such as vehicle speed data) generated by the vehicle.

The content player 1127 reproduces content stored in a storage medium (such as a CD and a DVD) that is inserted into the storage medium interface 1128. The input device 1129 includes, for example, a touch sensor configured to detect a touch on a screen of the display device 1130, a button, or a switch, and receives an operation or information inputted by a user. The display device 1130 includes a screen such as a LCD or an OLED display, and displays an image of the navigation function or reproduced content. The loudspeaker 1131 outputs sound of the navigation function or the reproduced content.

The wireless communication interface 1133 supports any cellular communication scheme (such as LTE, LTE-Advanced and NR), and performs wireless communication. The wireless communication interface 1133 may generally include, for example, a BB processor 1134 and an RF circuit 1135. The BB processor 1134 may perform, for example, encoding/decoding, modulating/demodulating, and multiplexing/de-multiplexing, and various signal processing for wireless communication. In addition, the RF circuit 1135 may include, for example, a mixer, a filter, and an amplifier, and transmits and receives a wireless signal via the antenna 1137. The wireless communication interface 1133 may also be a chip module having the BB processor 1134 and the RF circuit 1135 integrated thereon. As shown in FIG. 11, the wireless communication interface 1133 may include multiple BB processors 1134 and multiple RF circuits 1135. Although FIG. 11 shows an example in which the wireless communication interface 1133 includes the multiple BB processors 1134 and the multiple RF circuits 1135, the wireless communication interface 1133 may also include a single BB processor 1134 or a single RF circuit 1135.

In addition to the cellular communication scheme, the wireless communication interface 1133 may support another type of wireless communication scheme such as a short-distance wireless communication scheme, a near field communication scheme, and a wireless LAN scheme. In this case, the wireless communication interface 1133 may include the BB processor 1134 and the RF circuit 1135 for each wireless communication scheme.

Each of the antenna switches 1136 switches a connection destination of the antenna 1137 among multiple circuits (such as circuits for different wireless communication schemes) included in the wireless communication interface 1133.

Each of the antennas 1137 includes a single antenna element or multiple antenna elements (such as multiple antenna elements included in an MIMO antenna), and is used for the wireless communication interface 1133 to transmit and receive a wireless signal. As shown in FIG. 11, the vehicle navigation device 1120 may include multiple antennas 1137. Although FIG. 11 shows an example in which the vehicle navigation device 1120 includes the multiple antennas 1137, the vehicle navigation device 1120 may also include a single antenna 1137.

Furthermore, the vehicle navigation device 1120 may include an antenna 1137 for each wireless communication scheme. In this case, the antenna switches 1136 may be omitted in the configuration of the vehicle navigation device 1120.

The battery 1138 supplies power to blocks of the vehicle navigation device 1120 shown in FIG. 11 via feeders that are partially shown as dashed lines in FIG. 11. The battery 1138 accumulates power supplied from the vehicle.

In the vehicle navigation device 1120 shown in FIG. 11, the selection unit 110, the configuration unit 120, the detection unit 140 and the determination unit 150 shown in FIG. 1 may be implemented by the processor 1121. At least a part of functions may also be implemented by the processor 1121. For example, the processor 1121 may perform the functions of: selecting G groups of transmit beams, configuring information about the selected G groups of transmit beams, detecting channel quality, and determining a group of transmit beams selected by a network side device by executing instructions stored in the memory 1122.

The technology of the present disclosure may also be implemented as a vehicle system (or a vehicle) 1140 including one or more blocks in the vehicle navigation device 1120, the vehicle network 1141, and a vehicle module 1142. The vehicle module 1142 generates vehicle data (such as a vehicle speed, an engine speed and fault information), and outputs the generated data to the vehicle network 1141.

Preferred embodiments of the present disclosure are described above with reference to the drawings. However, the present disclosure is not limited to the above examples.

Those skilled in the art may obtain various modifications and changes within the scope of the appended claims. It should be understood that these modifications and changes fall within the technical scope of the present disclosure.

For example, a unit shown by a dashed-line block in functional block diagrams shown in the drawings is optional in a corresponding apparatus. Further, optional functional units may be combined in a suitable manner to achieve required functions.

For example, in the above embodiments, multiple functions included in one unit may be achieved by separate apparatuses. Alternately, in the above embodiments, multiple functions achieved by multiple units may be respectively achieved by separate apparatuses. In addition, one of the above functions may be achieved by multiple units. These configurations should be included in the technical scope of the present disclosure.

In this specification, the steps described in the flowcharts include not only processing performed in time series in the described order but also processing performed in parallel or individually instead of in time series. In addition, the steps performed in time series may be performed in a different order.

Although the embodiments of the present disclosure are described above in conjunction with the drawings, it should be understood that the described embodiments are only used to illustrate the present disclosure but not limit the present disclosure. For those skilled in the art, various changes and modifications may be made to the embodiments without departing from the essence and scope of the present disclosure. Therefore, the scope of the present disclosure is defined only by appended claims and equivalent meaning thereof.

The invention claimed is:

1. An electronic device for a user equipment, comprising:
at least one processor; and
at least one memory including computer program code, where the at least one memory and the computer program code are configured, with the at least one processor, to cause the device to at least:
  select a first transmit beam group and a second transmit beam group from a plurality of transmit beams from a network side device, each of the first and second transmit beam groups consisting of two beams comprising a first beam from a first set of beams and a second beam from a second set of beams, and the two beams in each of the first and second transmit beam groups can be received simultaneously by the user equipment, and
generate a channel state information (CSI) for reporting to the network side device, the CSI including
  a first CSI-RS or SSB resource indicator corresponding to the first beam in the first transmit beam group,
  a second CSI-RS or SSB resource indicator corresponding to the second beam in the first transmit beam group,
  a third CSI-RS or SSB resource indicator corresponding to the first beam in the second transmit beam group,
  a fourth CSI-RS or SSB resource indicator corresponding to the second beam in the second transmit beam group,
  a first value reflecting a quality of the first beam in the first transmit beam group,
  a second value reflecting a quality of the second beam in the first transmit beam group,
  a third value reflecting a quality of the first beam in the second transmit beam group, and
  a fourth value reflecting a quality of the second beam in the second transmit beam group.

2. The electronic device according to claim 1, wherein the at least one memory and the computer program code are configured, with the at least one processor, to cause the device to at least:
  in the CSI, arrange the first to fourth CSI-RS or SSB resource indicator and the first to fourth value in sequence, so that the network side device can identify the group of each CSI-RS or SSB resource indicator and the value reflecting quality thereof.

3. The electronic device according to claim 1, wherein the first value is an absolute value while the second, the third and the fourth values are relative values in terms of the first value.

4. The electronic device according to claim 1, wherein the CSI further comprises indicating information of CSI-RS or SSB resource set where the first/second set of beams are transmitted.

5. The electronic device according to claim 1, wherein the at least one memory and the computer program code are configured, with the at least one processor, to cause the device to at least:
  acquire an RRC signaling configuring a number of 2 transmit beam groups for report, and
  only select the first transmit beam group and the second transmit beam group accordingly.

6. The electronic device according to claim 1, wherein the at least one memory and the computer program code are configured, with the at least one processor, to cause the device to at least:
  acquire an RRC signaling configuring a number of 4 transmit beam groups for report, and
  further select a third transmit beam group and a fourth transmit beam group as well as include in the CSI:
    a fifth CSI-RS or SSB resource indicator corresponding to the first beam in the third transmit beam group,
    a sixth CSI-RS or SSB resource indicator corresponding to the second beam in the third transmit beam group,
    a seventh CSI-RS or SSB resource indicator corresponding to the first beam in the fourth transmit beam group,
    an eighth CSI-RS or SSB resource indicator corresponding to the second beam in the fourth transmit beam group, and
    the values reflecting qualities of the beams in the third and fourth transmit beam groups.

7. The electronic device according to claim 1, wherein the first to fourth values are RSRP of the corresponding beams as measured by the user equipment.

8. The electronic device according to claim 1, wherein the first to fourth values are RSRQ of the corresponding beams as measured by the user equipment.

9. The electronic device according to claim 1, wherein the first to fourth values are SINR of the corresponding beams as measured by the user equipment.

10. The electronic device according to claim 1, wherein the at least one memory and the computer program code are configured, with the at least one processor, to cause the device to at least acquire, from the network side device, downlink control information and MAC CE indicating the transmit beams selected by the network side device for transmitting downlink signals to the user equipment.

11. The electronic device according to claim 1, the device further comprises one or more transceivers, configured to receive CSI-RS or SSB on the CSI-RS or SSB resource set where the first/second set of beams are transmitted, and transmit the CSI in a single CSI report,
  wherein the device is implemented as the user equipment.

12. A base station, comprising:
at least one processor; and
at least one memory including computer program code, where the at least one memory and the computer program code are configured, with the at least one processor, to cause the base station to at least:
- transmit CSI-RS or SSB on a first CSI-RS or SSB resource set with a first set of transmit beams and a second CSI-RS or SSB resource set with a second set of transmit beams to a user equipment, and
- receive a CSI report from the user equipment indicating a first transmit beam group and a second transmit beam group selected by the user equipment, each of the first and second transmit beam groups consisting of two beams comprising a first beam from the first set of beams and a second beam from the second set of beams, and the two beams in each of the first and second transmit beam groups can be received simultaneously by the user equipment, wherein the CSI report includes
- a first CSI-RS or SSB resource indicator corresponding to the first beam in the first transmit beam group,
- a second CSI-RS or SSB resource indicator corresponding to the second beam in the first transmit beam group,
- a third CSI-RS or SSB resource indicator corresponding to the first beam in the second transmit beam group,
- a fourth CSI-RS or SSB resource indicator corresponding to the second beam in the second transmit beam group,
- a first value reflecting a quality of the first beam in the first transmit beam group,
- a second value reflecting a quality of the second beam in the first transmit beam group,
- a third value reflecting a quality of the first beam in the second transmit beam group, and
- a fourth value reflecting a quality of the second beam in the second transmit beam group.

13. The base station according to claim 12, wherein the at least one memory and the computer program code are configured, with the at least one processor, to cause the base station to at least:
in the CSI, acquire the first to fourth CSI-RS or SSB resource indicator and the first to fourth value in sequence, and identify the group of each CSI-RS or SSB resource indicator and the value reflecting quality thereof.

14. The base station according to claim 12, wherein the first value is an absolute value while the second, the third and the fourth values are relative values in terms of the first value.

15. The base station according to claim 13, wherein the at least one memory and the computer program code are configured, with the at least one processor, to cause the base station to at least:

transmit an RRC signaling configuring a number of 2 or 4 transmit beam groups for report, and
acquire information of the first transmit beam group and the second transmit beam group according to the configuration of 2 or 4 transmit beam groups for report.

16. The base station according to claim 12, wherein the first to fourth values are RSRP of the corresponding beams as measured by the user equipment.

17. The base station according to claim 12, wherein the first to fourth values are RSRQ of the corresponding beams as measured by the user equipment.

18. The base station according to claim 12, wherein the first to fourth values are SINR of the corresponding beams as measured by the user equipment.

19. The base station according to claim 12, wherein the at least one memory and the computer program code are configured, with the at least one processor, to cause the base station to at least select transmit beams for transmitting downlink signals to the user equipment based on the CSI report, and transmit downlink control information and MAC CE indicating the transmit beams selected.

20. A method for a base station, comprises:
transmitting CSI-RS or SSB on a first CSI-RS or SSB resource set with a first set of transmit beams and a second CSI-RS or SSB resource set with a second set of transmit beams to a user equipment, and
receiving a CSI report from the user equipment indicating a first transmit beam group and a second transmit beam group selected by the user equipment, each of the first and second transmit beam groups consisting of two beams comprising a first beam from the first set of beams and a second beam from the second set of beams, and the two beams in each of the first and second transmit beam groups can be received simultaneously by the user equipment, wherein the CSI report includes
- a first CSI-RS or SSB resource indicator corresponding to the first beam in the first transmit beam group,
- a second CSI-RS or SSB resource indicator corresponding to the second beam in the first transmit beam group,
- a third CSI-RS or SSB resource indicator corresponding to the first beam in the second transmit beam group,
- a fourth CSI-RS or SSB resource indicator corresponding to the second beam in the second transmit beam group,
- a first value reflecting a quality of the first beam in the first transmit beam group,
- a second value reflecting a quality of the second beam in the first transmit beam group,
- a third value reflecting a quality of the first beam in the second transmit beam group, and
- a fourth value reflecting a quality of the second beam in the second transmit beam group.

* * * * *